United States Patent
Moro et al.

(10) Patent No.: US 7,695,367 B2
(45) Date of Patent: Apr. 13, 2010

(54) STORAGE MEDIUM HAVING GAME PROGRAM STORED THEREON AND GAME APPARATUS

(75) Inventors: Isao Moro, Kyoto (JP); Hiromichi Miyake, Kyoto (JP); Toshinori Kawai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 817 days.

(21) Appl. No.: 11/327,352

(22) Filed: Jan. 9, 2006

(65) Prior Publication Data

US 2006/0258443 A1    Nov. 16, 2006

(30) Foreign Application Priority Data

May 13, 2005    (JP) .............................. 2005-141562

(51) Int. Cl.
*A63F 13/00* (2006.01)
*A63F 13/06* (2006.01)

(52) U.S. Cl. .............................. 463/37; 463/30; 463/32; 463/33; 273/317.1; 273/461; 348/39; 348/141; 345/419; 345/636; 345/653; 345/683

(58) Field of Classification Search ................. 463/1–5, 463/7–9, 30–34, 36–39, 40–43, 49–57; 273/148 R, 273/148 B, 309, 317.1, 340, 348, 361–367, 273/108.1, 127 R, 461; 348/115, 117, 211.14, 348/14.15, 39, 42, 47–52, 121, 135–137, 348/141, 576, 588–589, 719, 721, E13.004, 348/E13.064–E13.067; 717/168–178; 345/1.1–3.4, 345/2.1–2.3, 24, 419, 467–469, 539, 543–544, 345/625, 636, 638, 653–656, 664–666, 682–683, 345/686, 949–950, FOR. 139, FOR. 153; 434/37–38, 43–44, 69, 118, 240, 256–257; 375/240.15–240.16, 240.25
See application file for complete search history.

(56) References Cited

U.S. PATENT DOCUMENTS

| | | | | |
|---|---|---|---|---|
| 5,577,960 A | * | 11/1996 | Sasaki | ......................... 463/32 |
| 5,734,807 A | * | 3/1998 | Sumi | ......................... 345/427 |
| 5,779,548 A | * | 7/1998 | Asai et al. | ..................... 463/31 |
| 5,830,066 A | * | 11/1998 | Goden et al. | .................. 463/33 |
| 5,863,248 A | * | 1/1999 | Mine et al. | ..................... 463/4 |

(Continued)

FOREIGN PATENT DOCUMENTS

JP    2000-61142 A    2/2000

(Continued)

OTHER PUBLICATIONS

Wonder Life Special, Mr. Driller Drill Spirits Official Guide Book, Shogakukan Inc., Apr. 10, 2005, pp. 15-22.

*Primary Examiner*—Peter DungBa Vo
*Assistant Examiner*—Arthur O. Hall
(74) *Attorney, Agent, or Firm*—Nixon & Vanderhye P.C.

(57) ABSTRACT

A predetermined action is performed between a player object and another object positioned in a first determination range when a player designates said another object by controlling a pointing device. On the other hand, when the player performs an operation so as to designate said another object positioned outside the first determination range, a position of the player object is updated based on the designated position.

12 Claims, 18 Drawing Sheets

U.S. PATENT DOCUMENTS

| | | | | |
|---|---|---|---|---|
| 5,877,748 | A * | 3/1999 | Redlich | 345/163 |
| 5,880,709 | A * | 3/1999 | Itai et al. | 345/629 |
| 5,966,132 | A * | 10/1999 | Kakizawa et al. | 345/419 |
| 5,973,704 | A * | 10/1999 | Nishiumi et al. | 345/475 |
| 6,191,777 | B1 * | 2/2001 | Yasuhara et al. | 345/173 |
| 6,200,138 | B1 * | 3/2001 | Ando et al. | 434/61 |
| 6,226,002 | B1 * | 5/2001 | Yano et al. | 345/419 |
| 6,241,609 | B1 * | 6/2001 | Rutgers | 463/31 |
| 6,273,818 | B1 * | 8/2001 | Komoto | 463/31 |
| 6,304,267 | B1 * | 10/2001 | Sata | 345/427 |
| 6,326,963 | B1 * | 12/2001 | Meehan | 345/419 |
| 6,336,864 | B1 * | 1/2002 | Nakanishi | 463/33 |
| 6,371,849 | B1 * | 4/2002 | Togami | 463/4 |
| 6,404,436 | B1 * | 6/2002 | Goden | 345/473 |
| 6,409,604 | B1 * | 6/2002 | Matsuno | 463/43 |
| 6,424,353 | B2 * | 7/2002 | Yamamoto et al. | 345/619 |
| 6,431,982 | B2 * | 8/2002 | Kobayashi | 463/4 |
| 6,572,476 | B2 * | 6/2003 | Shoji et al. | 463/33 |
| 6,966,837 | B1 * | 11/2005 | Best | 463/33 |
| 7,252,588 | B2 * | 8/2007 | Takemoto et al. | 463/4 |
| 7,343,026 | B2 * | 3/2008 | Niwa et al. | 382/103 |
| 7,371,163 | B1 * | 5/2008 | Best | 463/1 |
| 7,399,224 | B2 * | 7/2008 | Hirai | 463/4 |
| 7,585,224 | B2 * | 9/2009 | Dyke-Wells | 463/31 |
| 2001/0029202 | A1 * | 10/2001 | Kondo et al. | 463/31 |
| 2003/0100364 | A1 * | 5/2003 | Mori | 463/30 |
| 2004/0176164 | A1 * | 9/2004 | Kobayashi | 463/30 |
| 2005/0009602 | A1 * | 1/2005 | Nishimura | 463/30 |

FOREIGN PATENT DOCUMENTS

| | | |
|---|---|---|
| JP | 2001-70648 A | 3/2001 |
| JP | 2002-939 | 1/2002 |
| JP | 2003-24628 A | 1/2003 |
| JP | 2003-150978 A | 5/2003 |
| WO | WO 2004/020061 A1 | 3/2004 |

* cited by examiner

F I G. 1
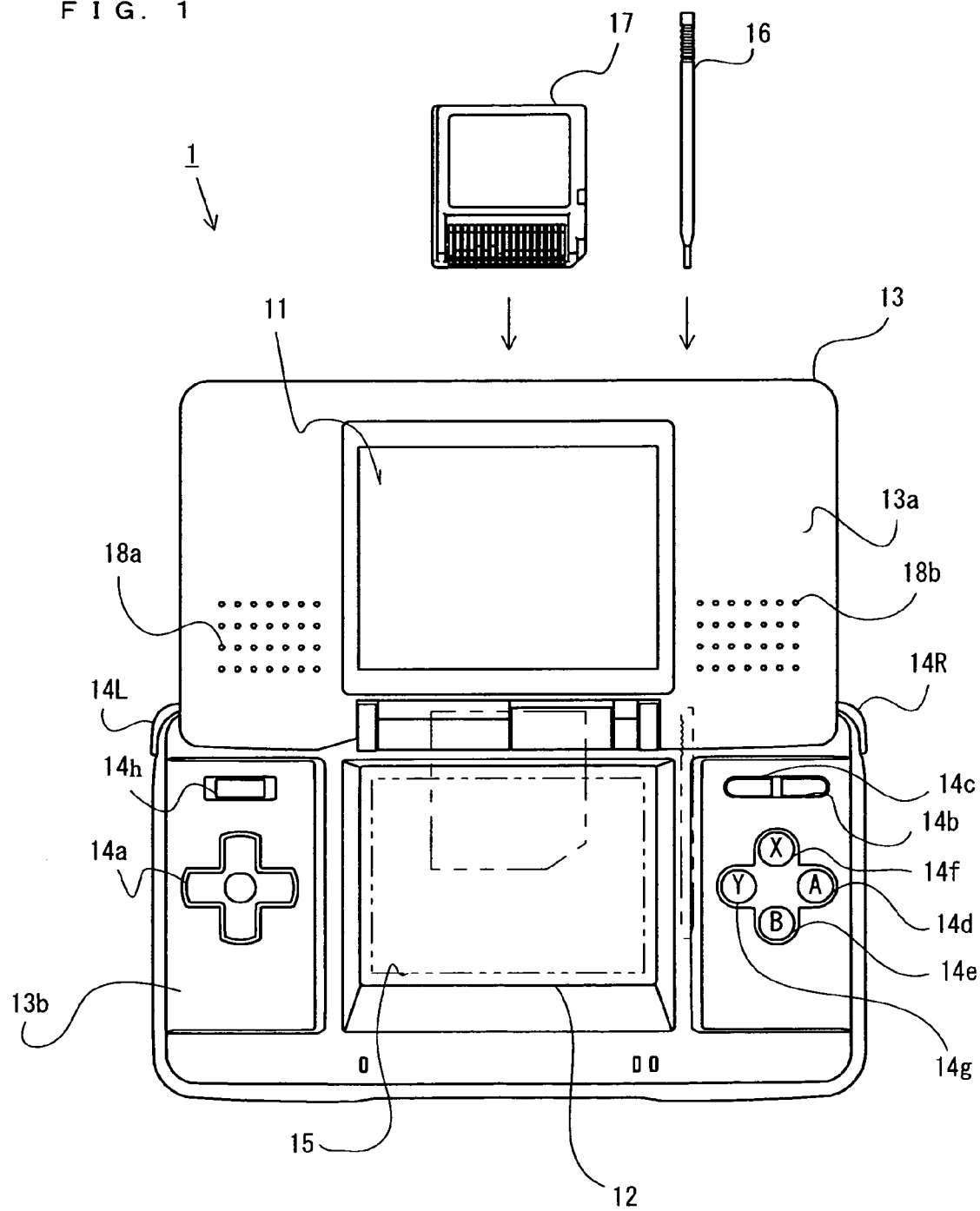

F I G. 1 0

| TOUCHED OBJECT \ EQUIPMENT | SHOVEL | AX | FISHING ROD |
|---|---|---|---|
| GROUND (FP) | PC DIGS A HOLE IN THE GROUND WITH SHOVEL | PC MOVES | PC MOVES |
| TREE (OBJ) | PC MOVES | PC CUTS TREE | PC MOVES |
| ROCK (OBJ) | ROCK REPELS SHOVEL | ROCK REPELS SHOVEL | PC MOVES |
| RIVER (FP) | PC SWINGS SHOVEL | PC MOVES | PC DOES FISHING |
| MAILBOX (OBJ) | PC OPENS MAILBOX | PC OPENS MAILBOX | PC OPENS MAILBOX |

STORAGE MEDIUM HAVING GAME PROGRAM STORED THEREON AND GAME APPARATUS

CROSS REFERENCE OF RELATED APPLICATION

The disclosure of Japanese Patent Application No. 2005-141562 is incorporated herein by reference.

BACKGROUND

1. Field of the Technology

The technology presented herein relates to a storage medium having a game program stored thereon and a game apparatus, and more particularly to a storage medium having stored thereon a game program and a game apparatus for determining a process based on coordinate information of a predetermined coordinate system outputted by a pointing device such as a touch panel.

2. Description of the Background Art

Conventionally, widespread is a game apparatus for providing a game which allows a player to control a character (player character) displayed on a game screen. For example, a game apparatus is provided with a pointing device such as a touch panel on a display screen so as to control the player character. For example, disclosed in Japanese Laid-Open Patent Publication No. 2002-939 (hereinafter, referred to as Patent Document 1) is a game in which a player touch-operates a touch panel as necessary so as to cause a player character appearing in a game image to perform an action. In the game disclosed in the Patent Document 1, as described in paragraphs 76 to 85, the player switches between an attack mode and a movement mode, and a distance between a character and a touch position is calculated for each mode so as to determine whether or not an attack is to be performed or/and whether or not a character is to be moved.

However, the operation performed using a pointing device must be a simplified operation for smooth game progress. For example, in the game disclosed in Patent Document 1, when a player controls the player character using only the pointing device, the player must frequently switches between the attack mode and the movement mode, and the like. This is troublesome to the player who desires to cause the character to perform a simple action. Further, the player must learn contents of commands and respective actions corresponding to keys in the case of a keyboard being used, and master some skill for controlling the player character. Consequently, the player is required to perform a complicated operation. Accordingly, it is required that a simplified method be used for playing the game.

SUMMARY

Therefore, a feature of an example embodiment presented herein is to provide a storage medium having stored thereon a game program and a game apparatus for causing characters to perform various actions by controlling the pointing device with a simplified method.

The example embodiment has the following features to attain the object mentioned above. The reference numerals, step numbers (a step is abbreviated as S and only a step number is indicated), and the like in the parentheses indicate the correspondence with the embodiment described below in order to aid in understanding the example embodiment and are not intended to limit, in any way, the scope of the example embodiment.

A first aspect of the example embodiment is directed to a storage medium having stored thereon a game program to be executed by a computer (21) of a game apparatus (1) which displays on a display screen (12) a game image representing at least a portion of a virtual space in which a player object (PC) and at least another object (OBJ, NPC) appear, and which is operated using a pointing device (15) for outputting input coordinates (DC1) of a coordinate system on the display screen according to an operation performed by a player. The game program causes the computer to execute: a virtually positioned coordinate storage step (D0, S50); a first determination range setting step (S93, S104); a detection step (S51); a designated object detection step (S57 to S59); a first action process step (S95, S107, S109, and S111); a player object position update step (S99 and S112); and a display control step (S65). The virtually positioned coordinate storage step stores, in a memory (24), virtually positioned coordinates (position coordinates of DO) indicating a position of the player object and a position of said another object in the virtual space. The first determination range setting step sets a first determination range (A1 and A3) based on the position of the player object in the virtual space, according to the virtually positioned coordinates (Xpc, Ypc, Zpc) of the player object. The detection step detects input coordinates outputted by the pointing device. The designated object detection step detects, when the input coordinates on the display screen overlap with one of the player object and said another object positioned in the virtual space, the object with which the input coordinates overlap as a designated object which is designated by the player (FIG. 5). The first action process step executes, when the designated object is determined as being said another object in the first determination range based on the virtually positioned coordinates of the designated object (Yes in S94 and Yes in S105), a predetermined action between the designated object and the player object. The player object position update step updates, when the designated object is determined as being outside the first determination range based on the virtually positioned coordinates of the designated object (No in S94 and No in S105), the virtually positioned coordinates of the player object stored in the memory such that the player object is moved in a direction of a point (TG) which is in the virtual space and which overlaps with the input coordinates on the display screen. The display control step displays, on the display screen, the player object and said another object based on the virtually positioned coordinates for each object stored in the memory. The pointing device is an input device for designating an input position and coordinates on a screen, such as a touch panel, a mouse, a track pad, and a track ball. A coordinate system used for each input device is a touch panel coordinate system or a screen coordinate system.

In a second aspect, the first action process step includes a step (S91, S101 to S106, and FIG. 10) of determining an action to be performed between the player object and said another object according to a combination of an item held by the player object and a type of said another object.

In a third aspect, the player object position update step includes a step (S112) of updating, based on the input coordinates, the player object position data stored in the memory when the designated object is not detected in the designated object detection step (No in S105).

In a fourth aspect, the first determination range setting step includes a step of changing a size of the first determination range (A3) according to an item held by the player object.

In a fifth aspect, the first determination range is set in the virtual space as a range having a predetermined angle between a facing direction of the player object and a direction offset to a left side of the facing direction and the same predetermined angle between the facing direction of the player object and a direction offset to a right side of the facing direction (θ1 and θ3), based on the virtually positioned coordinates of the player object.

In a sixth aspect, the game program causes the computer to further execute: a second determination range setting step (S96) and a second action process step (S98). The second determination range setting step sets, in the virtual space, a second determination range (A2) which is different from the first determination range, based on the position of the player object. The second action process step performs, when the designated object detected in the designated object detection step is a specific object (NPC) positioned in the second determination range outside the first determination range based on the virtually positioned coordinates of the designated object (Yes in S97), an action between the specific object and the player object, the action being different from the action performed in the first action process step between the specific object and the player object.

In a seventh aspect, the game program causes the computer to further execute a player action process step (S102). The player action process step performs, when the designated object detected in the designated object detection step is the player object (Yes in S101), a predetermined action between the player object and said another object positioned in the first determination range based on the virtually positioned coordinates of said another object.

An eighth aspect is directed to a storage medium having stored thereon a game program to be executed by a computer of a game apparatus which displays on a display screen a game image representing at least a portion of a virtual space in which a player object and at least another object appear, and which is operated using a pointing device for outputting input coordinates of a coordinate system on the display screen according to an operation performed by a player. The game program causes the computer to executes: a virtually positioned coordinate storage step; a first determination range setting step; a virtual input coordinate calculation step (S60); a designated object detection step; a first action process step; a player object position update step; and a display control step. The virtually positioned coordinate storage step stores, in a memory, virtually positioned coordinates indicating a position of the player object and a position of said another object in the virtual space. The first determination range setting step sets a first determination range based on the position of the player object in the virtual space, according to the virtually positioned coordinates of the player object. The virtual input coordinate calculation step calculates, when the input coordinates are outputted, virtual input coordinates (DC2) which are in the virtual space and overlap with the input coordinates on the display screen. The designated object detection step detects, when the virtual input coordinates calculated in the virtual input coordinate calculation step overlap with one of the player object and said another object positioned in the virtual space, the object with which the virtual input coordinates overlap as a designated object which is designated by the player. The first action process step executes, when the designated object is determined as being said another object in the first determination range based on the virtually positioned coordinates of the designated object, a predetermined action between the designated object and the player object. The player object position update step updates, when the designated object is determined as being outside the first determination range based on the virtually positioned coordinates of the designated object, the virtually positioned coordinates of the player object stored in the memory based on the virtual input coordinates such that the player object is moved in a direction based on the virtual input coordinates. The display control step displays, on the display screen, the player object and said another object based on the virtually positioned coordinates for each object stored in the memory.

In a ninth aspect, the virtual input coordinate calculation step includes a step of calculating, when the input coordinates on the display screen overlap with a game field (FD) disposed in the virtual space, the virtual input coordinates on the game field.

In a tenth aspect, the first action process step includes a step (S91, S101 to S106, and FIG. 10) of determining an action to be performed between the player object and said another object according to a combination of an item held by the player object and a type of said another object.

In an eleventh aspect, the player object position update step includes a step (S112) of updating, based on the virtual input coordinates, the player object position data stored in the memory when the designated object is not detected in the designated object detection step (No in S105).

In a twelfth aspect, the first determination range setting step includes a step of changing a size of the first determination range (A3) according to an item held by the player object.

In a thirteenth aspect, the first determination range is set in the virtual space as a range having a predetermined angle between a facing direction of the player object and a direction offset to a left side of the facing direction and the same predetermined angle between the facing direction of the player object and a direction offset to a right side of the facing direction (θ1 and θ3), based on the virtually positioned coordinates of the player object.

In a fourteenth aspect, the game program causes the computer to further execute a second determination range setting step (S96) and a second action process step (S98). The second determination range setting step sets, in the virtual space, a second determination range (A2) which is different from the first determination range, based on the position of the player object. The second action process step performs, when the designated object detected in the designated object detection step is a specific object (NPC) positioned in the second determination range outside the first determination range (Yes in S97) based on the virtually positioned coordinates of the designated object, an action between the specific object and the player object, the action being different from the action performed in the first action process step between the specific object and the player object.

In a fifteenth aspect, the game program causes the computer to further execute a player action process step (S102). The player action process step performs, when the designated object detected in the designated object detection step is the player object (Yes in S101), a predetermined action between the player object and said another object positioned in the first determination range based on the virtually positioned coordinates of said another object.

A sixteenth aspect is directed to a game apparatus which displays on a display screen a game image representing at least a portion of a virtual space in which a player object and at least another object appear, and which is operated using a pointing device for outputting input coordinates of a coordinate system on the display screen according to an operation performed by a player. The game apparatus comprises: a storage means (24); a virtually positioned coordinate storage control means; a first determination range setting means; a detection means; a designated object detection means; a first action process means; a player object position update means; and a display control means. The virtually positioned coordinates storage control means stores, in the storage means, virtually positioned coordinates indicating a position of the player object and a position of said another object in the virtual space. The first determination range setting means sets a first determination range based on the position of the player object in the virtual space, according to the virtually positioned coordinates of the player object. The detection means detects input coordinates outputted by the pointing device. The designated object detection means detects, when the input coordinates on the display screen overlap with one of the player object and said another object positioned in the virtual space, the object with which the input coordinates overlap as a designated object which is designated by the player. The first action process means executes, when the designated object is determined as being said another object in the first determination range based on the virtually positioned coordinates of the designated object, a predetermined action between the designated object and the player object. The player object position update means updates, when the designated object is determined as being outside the first determination range based on the virtually positioned coordinates of the designated object, the virtually positioned coordinates of the player object stored in the storage means such that the player object is moved in a direction of a point which is in the virtual space and which overlaps with the input coordinates on the display screen. The display control means displays, on the display screen, the player object and said another object based on the virtually positioned coordinates for each object stored in the storage means.

A seventeenth aspect is directed to a game apparatus which displays on a display screen a game image representing at least a portion of a virtual space in which a player object and at least another object appear, and which is operated using a pointing device for outputting input coordinates of a coordinate system on the display screen according to an operation performed by a player. The game apparatus comprises: a storage means; a virtually positioned coordinate storage control means; a first determination range setting means; a virtual input coordinate calculation means; a designated object detection means; a first action process means; a player object position update means; and a display control means. The virtually positioned coordinate storage control means stores, in the storage means, virtually positioned coordinates indicating a position of the player object and a position of said another object in the virtual space. The first determination range setting means sets a first determination range based on the position of the player object in the virtual space, according to the virtually positioned coordinates of the player object. The virtual input coordinate calculation means calculates, when the input coordinates are outputted, virtual input coordinates which are in the virtual space and overlap with the input coordinates on the display screen. The designated object detection means detects, when the virtual input coordinates calculated by the virtual input coordinate calculation means overlap with one of the player object and said another object positioned in the virtual space, the object with which the virtual input coordinates overlap as a designated object which is designated by the player. The first action process means executes, when the designated object is determined as being said another object in the first determination range based on the virtually positioned coordinates of the designated object, a predetermined action between the designated object and the player object. The player object position update means updates, when the designated object is determined as being outside the first determination range based on the virtually positioned coordinates of the designated object, the virtually positioned coordinates of the player object stored in the storage means based on the virtual input coordinates such that the player object is moved in a direction based on the virtual input coordinates. The display control means displays, on the display screen, the player object and said another object based on the virtually positioned coordinates for each object stored in the storage means.

According to the first and the eighth aspects, the first determination range is set based on the player object, and the action varies depending on a relationship between the first determination range and a position designated by the player. Specifically, when a designated target is another object in the first determination range, the player object is caused to perform a predetermined action on said another object. On the other hand, when the designated target is outside the first determination range, the player object is caused to perform an action so as to move based on the designated position. Accordingly, a character is caused to perform various actions through a simplified same common operation performed by the player.

According to the ninth aspect, the player can designate an action for moving the player object based on the designated position in a game field.

According to the second and the tenth aspects, an action is determined based on a combination of the item held by the player object and the type of the target object. The action can be changed according to the combination. Accordingly, an action performed by a character can be changed depending on the item and the object type through a simplified same common operation.

According to the third and the eleventh aspects, even when the player does not designate an object, an action is performed according to an operation performed by the player. Therefore, a player can avoid an operation in which a player object makes no reaction.

According to the fourth and the twelfth aspects, the first determination range has a size varying depending on the item held by the player object. For example, the first determination range can have the size varying according to characteristics of the item having been set. That is, the first determination range may be smaller when the player object has an item used for the object which is relatively close to the player object. The first determination range may be larger when the player object has an item used for the object which is relatively far from the player object. Accordingly, the first determination range can be set according to item characteristics represented in the virtual space, so as to be realistic, whereby the reality of the action can be increased.

According to the fifth and the thirteenth aspects, the first determination range is set in front of the player object, whereby different actions can be performed between when a designated target is behind the player object and when the designated target is in front thereof. Thereby, an action can be represented according to a direction of the player object, so as to be realistic.

According to the sixth and the fourteenth aspects, the player object can be caused to perform various actions on the same specific object (for example, non-player character) through a same common operation. Specifically, different actions can be represented according to a distance between the player object and the specific object.

According to the seventh and the fifteenth aspects, when a player object is designated through a player's operation, a predetermined action is performed between the player object and another object in the first determination range. Accordingly, a character is caused to perform various actions only by designating the player object.

Further, the game apparatus according to the example embodiment enables the same effect as that of the aforementioned game program to be obtained.

These and other features, aspects and advantages of the example embodiment presented herein will become more apparent from the following detailed description of the example embodiment when taken in conjunction with the accompanying drawings.

BRIEF DESCRIPTION OF THE DRAWINGS

FIG. 1 is a view illustrating an outer appearance of a game apparatus 1 for executing a game program of the example embodiment;

FIG. 10 is a diagram illustrating an example of action contents;

DESCRIPTION OF THE PREFERRED EMBODIMENTS

Figure 2:
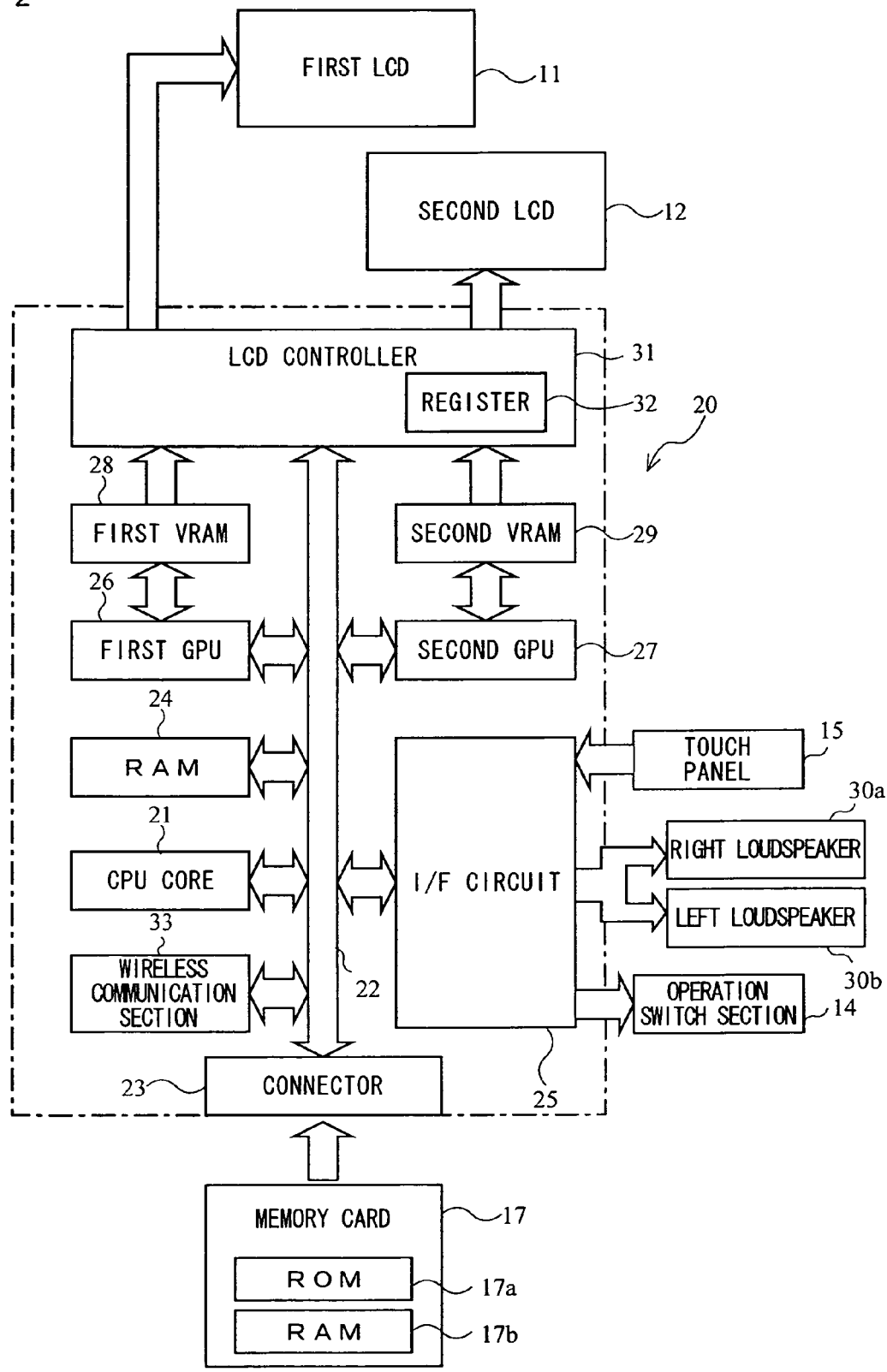
FIG. 2 is a block diagram illustrating an internal structure of the game apparatus 1 shown in FIG. 1.

A game apparatus for executing a game program according to an embodiment will be described with reference to the drawings. While the game program of the example embodiment is executed by any computer system capable of performing a display on a display device, a description of a case where the game program is executed by an information processing apparatus such as a game apparatus 1 will be given. FIG. 1 is a view illustrating an outer appearance of the game apparatus 1 for executing the game program of the example embodiment. In the present embodiment, a portable game apparatus will be described as an example of the game apparatus 1.

In FIG. 1, a game apparatus 1 includes a first liquid crystal display (hereinafter, referred to as "an LCD") 11 and a second LCD 12. A housing 13 is composed of an upper housing 13a and a lower housing 13b. The first LCD 11 is accommodated in the upper housing 13a and the second LCD 12 is accommodated in the lower housing 13b. Each of the first LCD 11 and the second LCD 12 has a resolution of 256 dots×192 dots. Although in the present embodiment, an LCD is used as a display device, any other display device, for example, a display device using an EL (electro luminescence), can be used. Further, the resolutions of the first LCD 11 and the second LCD 12 may be arbitrarily chosen.

On the upper housing 13a, provided are sound holes 18a and 18b for outputting a sound from a pair of loudspeakers 30a and 30b shown in FIG. 2 described below.

On the lower housing 13b, provided as input devices are a cross switch 14a, a start switch 14b, a select switch 14c, an A button 14d, a B button 14e, an X button 14f, a Y button 14g, a power supply switch 14h, an L button 14L and an R button 14R. Further, the second LCD 12 has a touch panel 15 mounted on the screen thereof as another input device. Moreover, the lower housing 13b is provided with respective receptacles into which a memory card 17 and a stick 16 are inserted.

The touch panel 15 may be of any type such as a resistive film type, an optical type (infrared type), or a capacitive coupling type. The touch panel 15 is, for example a pointing device having a function of outputting, when the touch panel 15 has its surface touched by the stick 16, coordinate data corresponding to the touched position. Although in the present embodiment a player controls the touch panel 15 with the stick 16, the player can control the touch panel 15 with a pen (stylus pen) or a finger instead of the stick 16. In the present embodiment, the touch panel 15 has a resolution (detection accuracy) of 256 dots×192 dots, similar to the resolution of the second LCD 12. However, the touch panel 15 need not necessarily have the same resolution as the second LCD 12.

The memory card 17 is a storage medium having a game program and the like stored thereon, and is detachably inserted into the receptacle provided in the lower housing 13b.

Next, referring to FIG. 2, the internal structure of the game apparatus 1 will be described. FIG. 2 is a block diagram illustrating an internal structure of the game apparatus 1.

In FIG. 2, a CPU core 21 is mounted on the electronic circuit board 20 accommodated in the housing 13. Via a bus 22, the CPU core 21 is connected to a connector 23, an input/output interface circuit (denoted as an I/F circuit in FIG. 2) 25, a first graphics processing unit (hereinafter, referred to as "GPU") 26, a second GPU 27, a RAM 24, an LCD controller 31, and a wireless communication section 33. The memory card 17 is detachably connected to the connector 23. The memory card 17 includes a ROM 17a for storing a game program and a RAM 17b for storing backup data in a rewritable manner. A game program stored in the ROM 17a of the memory card 17 is loaded to the RAM 24, and the game program having been loaded to the RAM 24 is executed by the CPU core 21. Data used for generating temporary data obtained by the CPU core 21 executing the program, and the like, are stored in the RAM 24 as necessary in addition to the game program. The touch panel 15, the right loudspeaker 30a, the left loudspeaker 30b and an operation switch section 14 including the cross switch 14a, the A button 14d and the like as shown in FIG. 1 are connected to the I/F circuit 25. The right loudspeaker 30a and the left loudspeaker 30b are placed inside the sound holes 18a and 18b, respectively.

The first GPU 26 is connected to a first video-RAM (hereinafter, referred to as "VRAM") 28. The second GPU 27 is connected to a second VRAM 29. In accordance with an instruction from the CPU core 21, the first GPU 26 generates a first display image using the data stored in the RAM 24 for generating the display image, and writes display image data into the first VRAM 28. Similarly, in accordance with an instruction from the CPU core 21, the second GPU 27 generates a second display image, and writes display image data into the second VRAM 29. The first VRAM 28 and the second VRAM 29 are connected to the LCD controller 31.

The LCD controller 31 include a register 32. The register 32 stores a value "0" or "1" in accordance with an instruction from the CPU core 21. When the register 32 stores a value "0", the LCD controller 31 outputs to the first LCD 11 the first game image which has been written into the first VRAM 28, and outputs to the second LCD 12 the second game image which has been written into the second VRAM 29. On the other hand, when the register 32 stores a value "1", the LCD controller 31 outputs to the second LCD 12 the first game image which has been written into the first VRAM 28, and outputs to the first LCD 11 the second game image which has been written into the second VRAM 29.

The wireless communication section 33 has a function of exchanging data used for game process and other data with a wireless communication section 33 of another game apparatus, and the function is, for example, a wireless communication function based on the IEEE802.11 wireless LAN standard. The wireless communication section 33 outputs the received data to the CPU core 21. Further, the wireless communication section 33 transmits data to another game apparatus according to an instruction from the CPU core 21. The wireless communication section 33 or the storage section of the game apparatus 1 has a protocol such as TCP/IP (transmission control protocol/Internet protocol) or a predetermined browser, whereby the game apparatus 1 can be connected to a network such as the Internet via the wireless communication section 33. The game apparatus 1 enables data such as a document and an image accessible on a network to be displayed on the first LCD 11 and the second LCD 12.

The game program of the example embodiment may be supplied to the computer system not only through an external storage medium such as the memory card 17 but also through a wired or a wireless communication line. Moreover, the game program may be previously stored in a non-volatile storage device in the computer system. Examples of the information storage medium for storing the game program are not limited to the aforementioned non-volatile semiconductor memory, but may also be a CD-ROM, a DVD or any other optical disk type storage medium.

Figure 3:
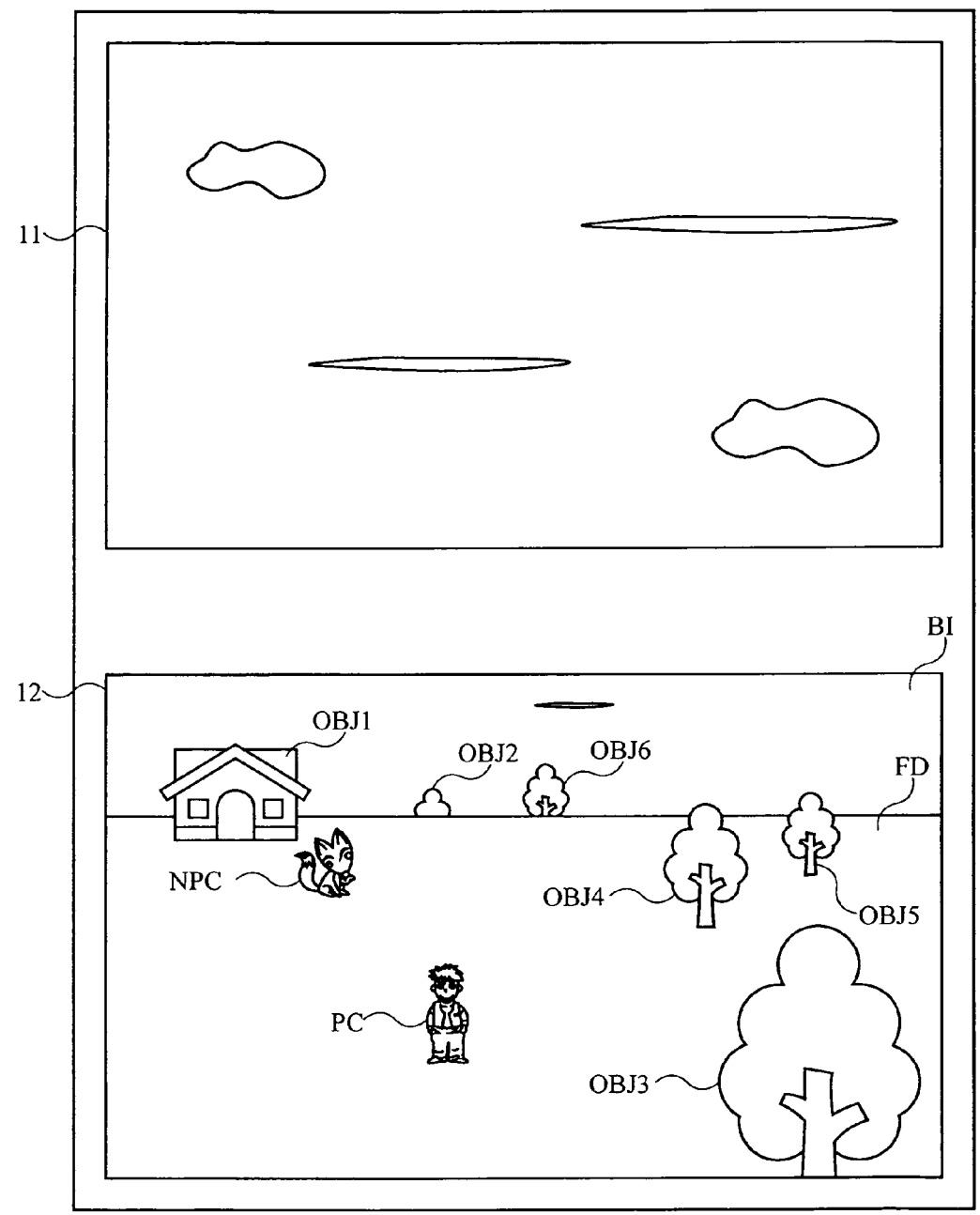
FIG. 3 is a diagram illustrating an example of screen display on a first LCD 11 and a second LCD 12.
Figure 4:
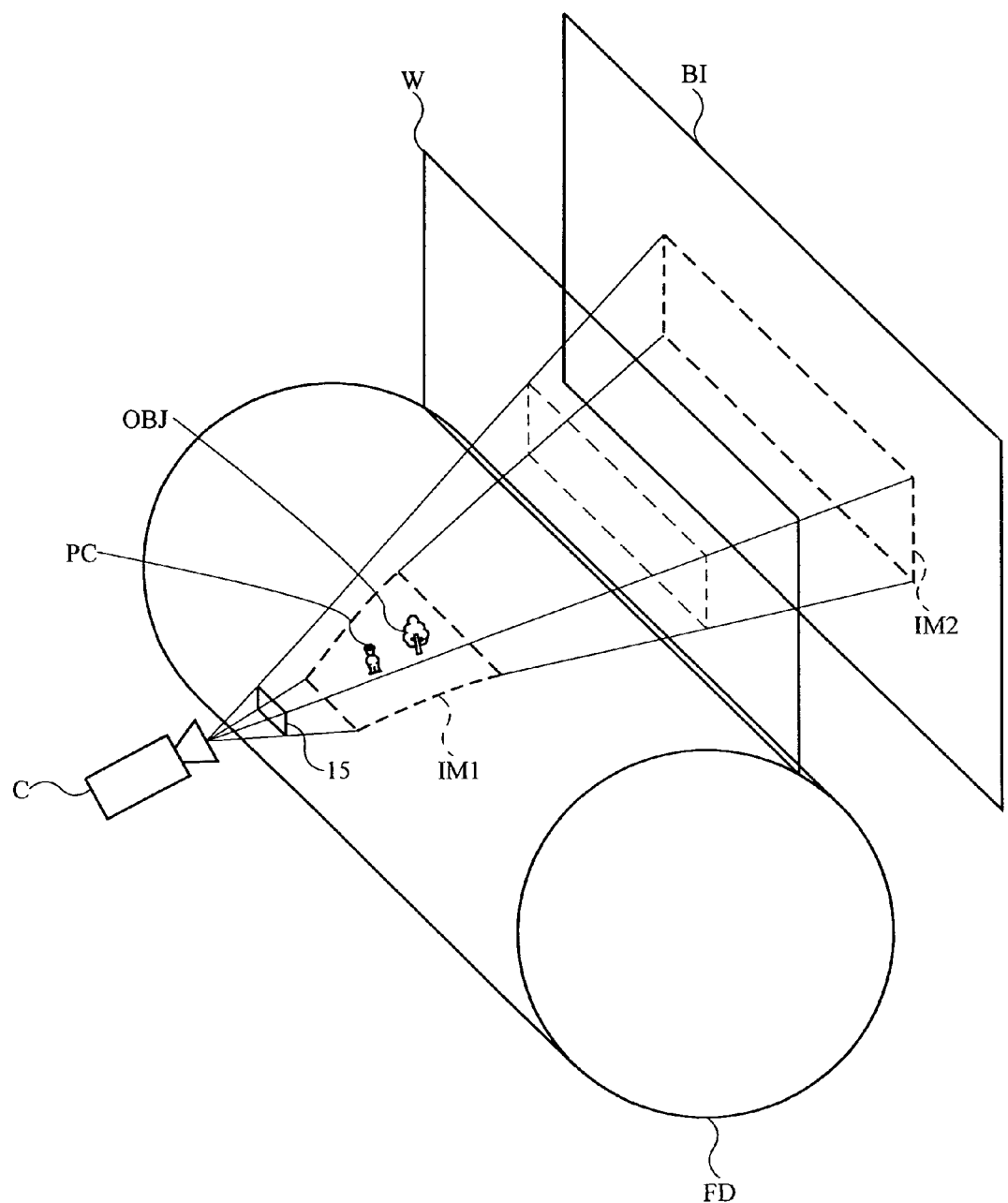
FIG. 4 is a schematic perspective view illustrating a positional relationship between a touch panel 15 and a drum coordinate system used for obtaining a game image to be displayed on the second LCD 12.
Figure 5:
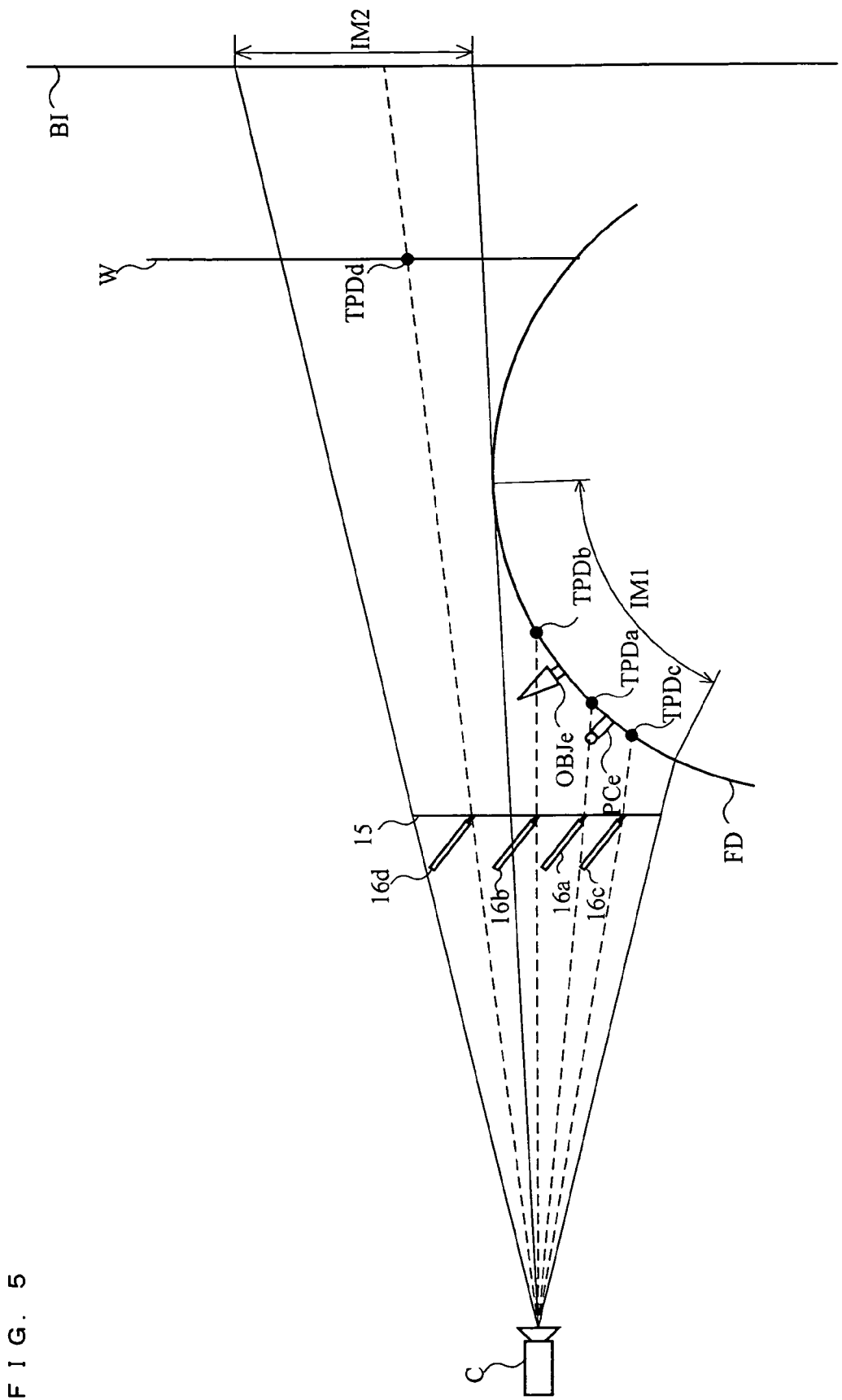
FIG. 5 is a side view illustrating a positional relationship between the drum coordinate system and the touch panel 15.
Figure 6:
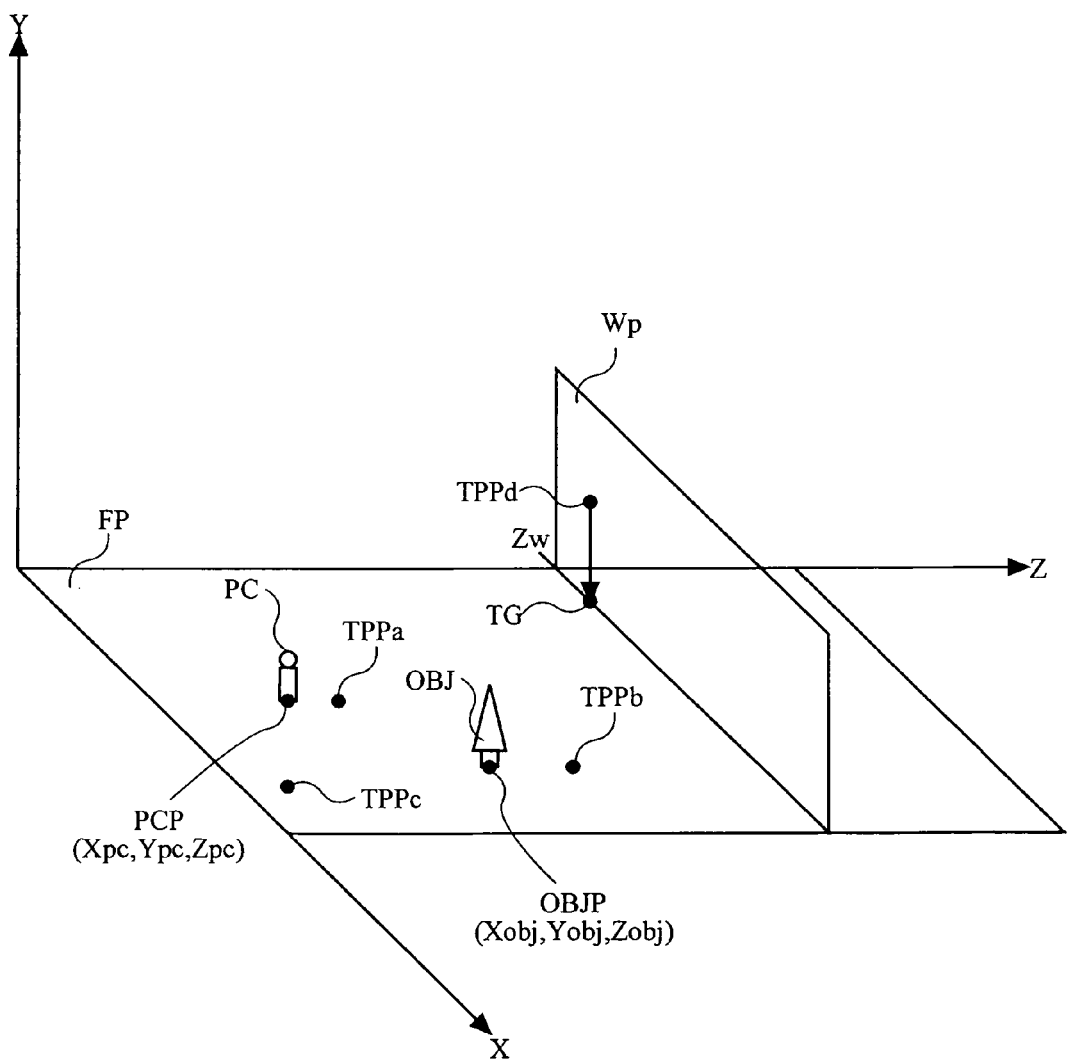
FIG. 6 is a schematic perspective view illustrating a plane coordinate system used for a game process.
Figure 7:
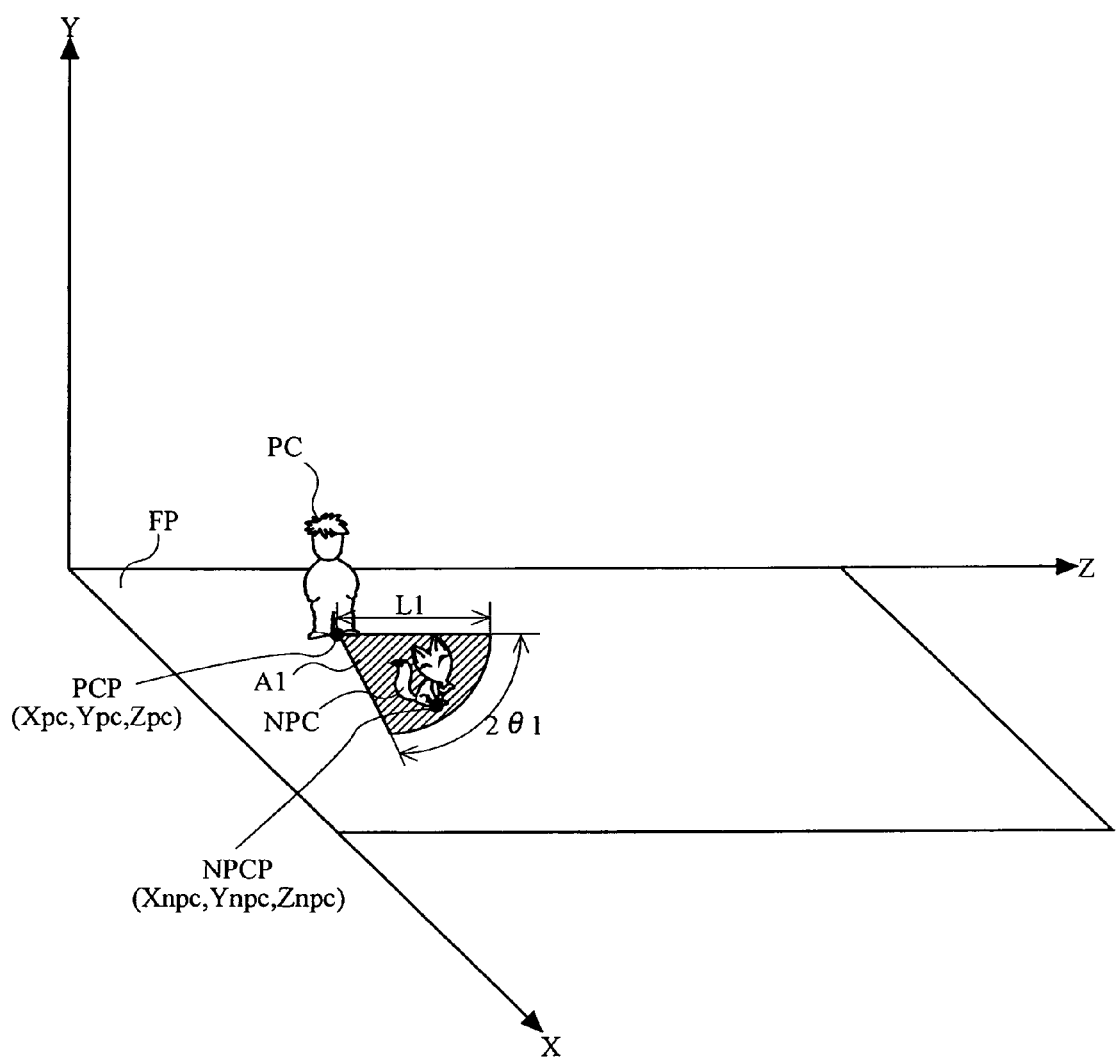
FIG. 7 is a schematic perspective view illustrating a conversation range A1 set for a player character PC.
Figure 8:
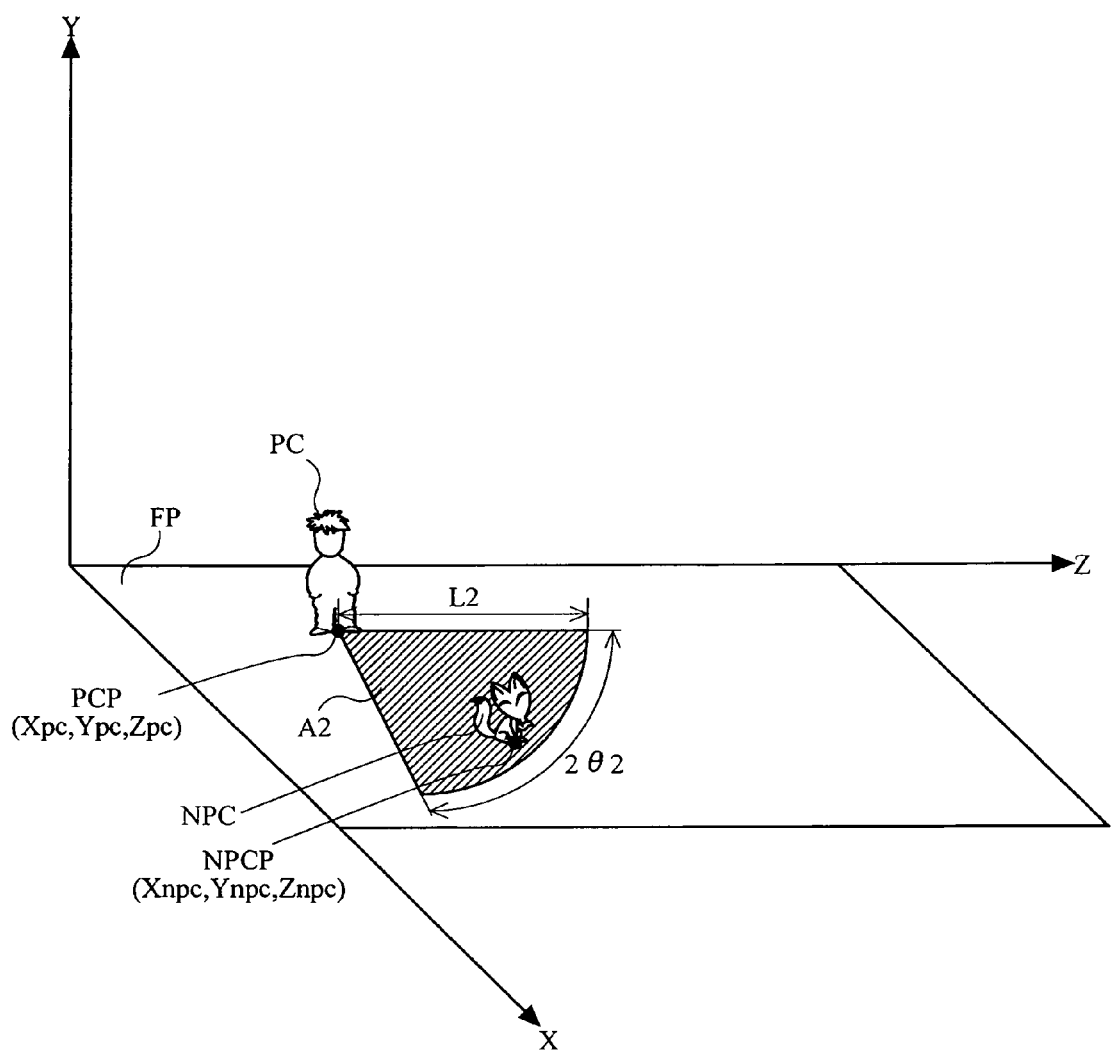
FIG. 8 is a schematic perspective view illustrating a call range A2 set for the player character PC.
Figure 9:
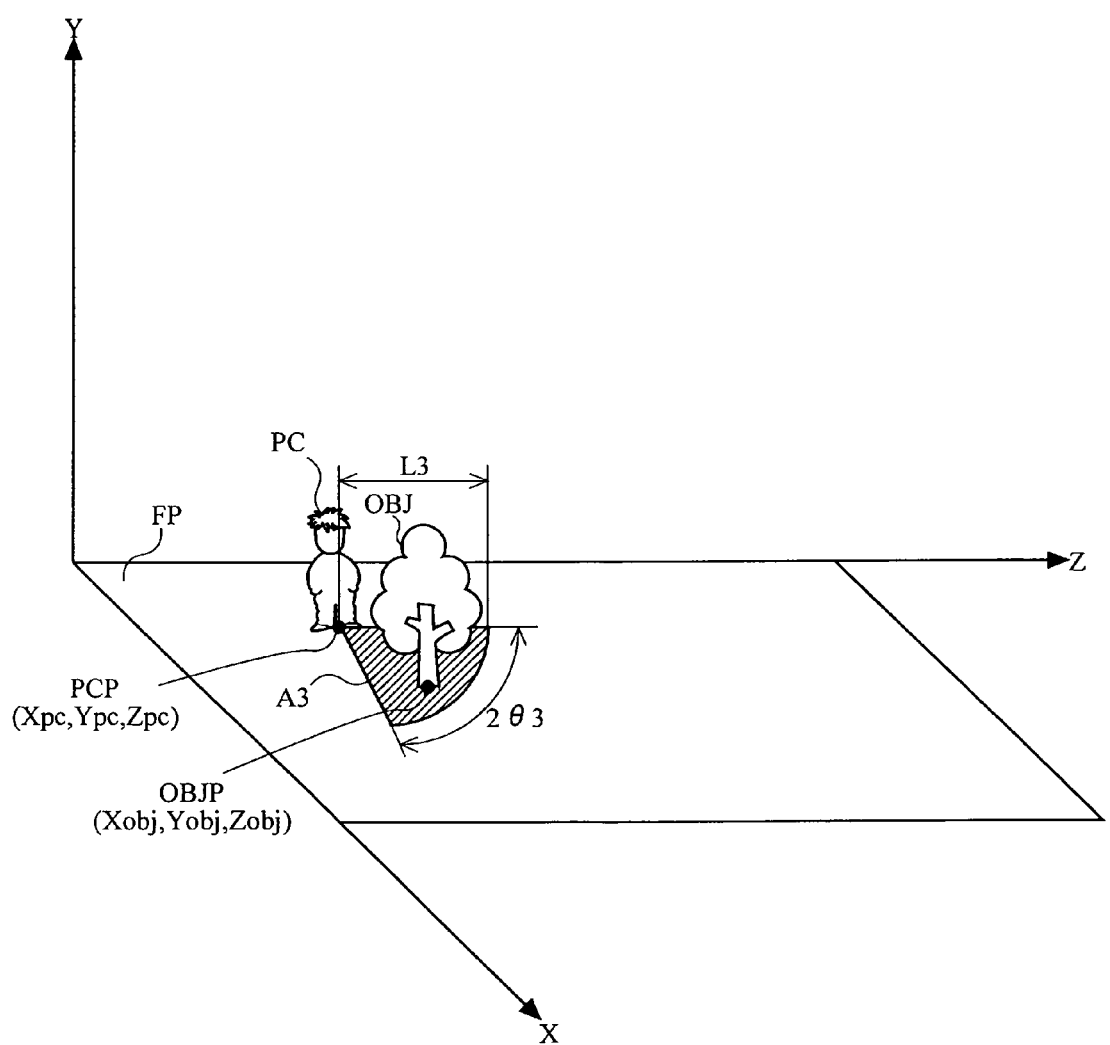
FIG. 9 is a schematic perspective view illustrating an action range A3 set for the player character PC.
Figure 11:
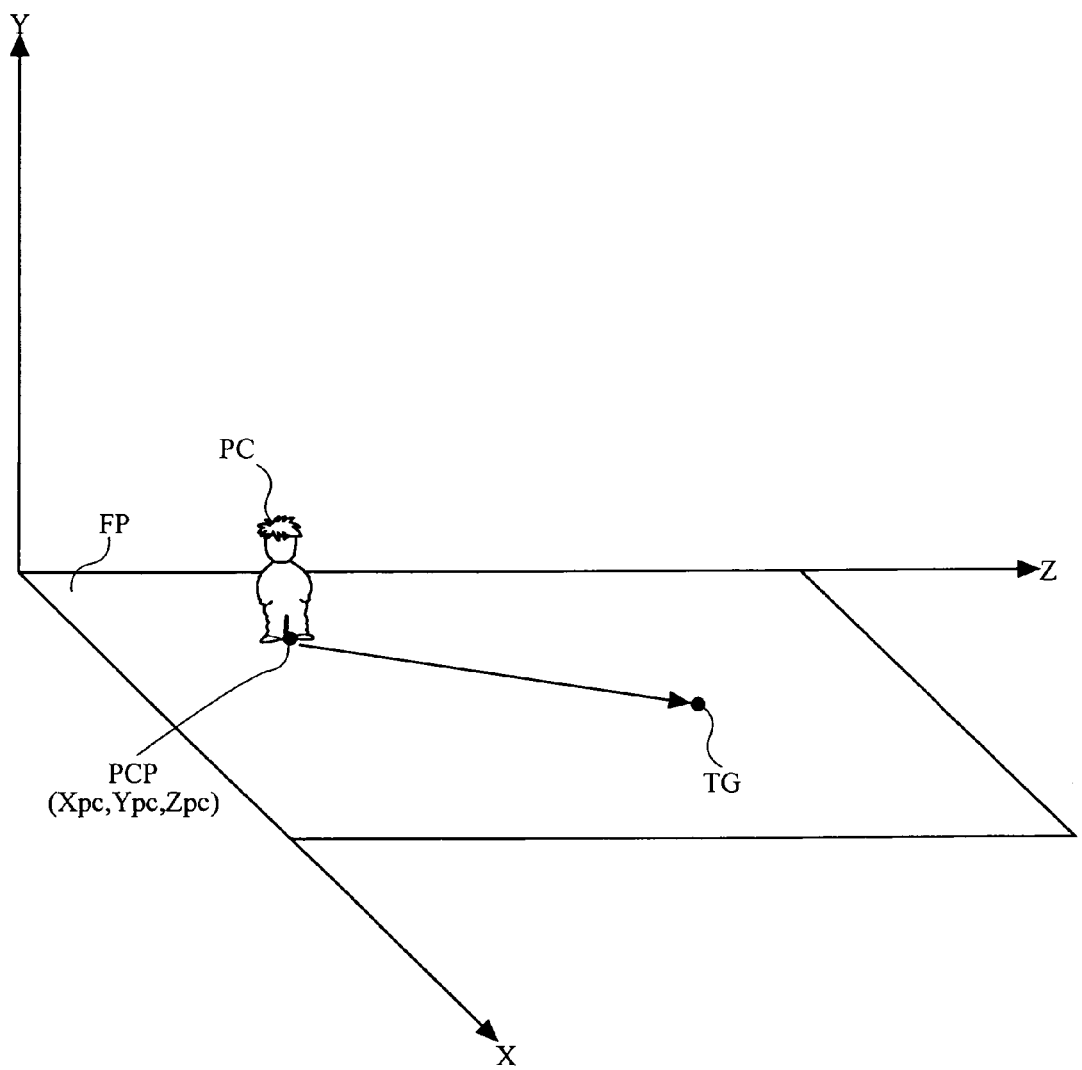
FIG. 11 is a diagram illustrating an action of moving the player character PC.

Next, a specific process operation performed by the game apparatus 1 executing the game program will be described. Firstly, with reference to FIGS. 3 to 11, an example of process, an example of a display method for performing displays on the first LCD 11 and the second LCD 12 through the process operation, and the like will be described. FIG. 3 is a diagram illustrating an example of screen display on the first LCD 11 and the second LCD 12. FIG. 4 is a schematic perspective view illustrating a positional relationship between the touch panel 15 and a drum coordinate system used for obtaining a game image to be displayed on the second LCD 12. FIG. 5 is a side view illustrating a positional relationship between the drum coordinate system and the touch panel 15. FIG. 6 is a schematic perspective view illustrating a plane coordinate system used for a game process. FIG. 7 is a schematic perspective view illustrating a conversation range A1 set for a player character PC. FIG. 8 is a schematic perspective view illustrating a call range A2 set for the player character PC. FIG. 9 is a schematic perspective view illustrating an action range A3 set for the player character PC. FIG. 10 is a diagram illustrating an example of action contents. FIG. 11 is a diagram illustrating an action of moving the player character PC.

In FIG. 3, a game image is displayed on each of the first LCD 11 and the second LCD 12 of the game apparatus 1. The game image according to the present invention is mainly displayed on the second LCD 12. Hereinafter, an image displayed on the second LCD 12 is merely described as a game image.

The player character PC, a non-player character NPC, and objects OBJ are positioned on a drum field FD in a game space and displayed in a game image on the second LCD 12. For example, one player character PC, one non-player character NPC and six objects OBJ1 to OBJ6 are displayed in the game image shown in FIG. 3. The drum field FD is a cylindrical field in which a portion of the cylindrically curved surface is displayed in the game image and the cylinder axis is horizontally disposed in the game space. The player character PC, the non-player character NPC, and objects OBJ are positioned on the cylindrically curved surface in the drum field FD. For example, the player character PC is a character which can move along the cylindrically curved surface of the drum field FD in the game space. Further, a background BI (for example, the sky) is displayed at the back of the drum field FD. In FIG. 3, for example, the game image is obtained by perspective-projecting the cylindrically curved surface from a virtual camera when the cylindrically curved surface as seen from the side of the drum field FD is set as a sight point and a portion of the cylindrically curved surface is set as a rendered range.

FIG. 4 shows a virtual three-dimensional game space in which the touch panel 15 and a virtual camera C used for obtaining the game image are disposed. In a drum coordinate system, the drum field FD, the background BI, and a virtual wall W are disposed in the game space. The virtual wall W is, for example, a virtual transparent plane set parallel to the cylinder axis of the drum field FD. The virtual camera C is disposed at the side of the cylindrically curved surface of the drum field FD. The game space set in a viewing volume between predetermined clipping planes based on a camera position of the virtual camera C is displayed in the game image on the second LCD 12. In FIG. 4, for example, the game image is composed of an image IM1 and an image IM2. The image IM1 is obtained by perspective-projecting, from the virtual camera C, a portion of the cylindrically curved surface of the drum field FD. The image IM2 is obtained by perspective-projecting, through a portion of the virtual wall W at the back of the drum field FD, the background BI rendered at the back of the virtual wall W. At this time, a rendering model of each of the objects, such as the player character PC and the object OBJ in FIG. 4, is positioned on the drum field FD, based on a position which is obtained by converting position coordinates described below into coordinates in the drum coordinate system. The rendering models in the viewing volume are also displayed on the second LCD 12. The touch panel 15 is represented at the near clipping plane as seen from the virtual camera C (that is, at the side of the virtual camera C), thereby setting a touch panel coordinate system. Input coordinates from the touch panel 15 are perspective-projected along a line of sight direction of the virtual camera C into the game space.

FIG. 5 shows that touch input coordinates obtained when a player touches the touch panel 15 are perspective-projected into the game space. In the present embodiment, a simplified model is used for determining a target object touch-operated by the player. Here, the simplified model is a model obtained by simplifying each rendering model used for obtaining a game image. The simplified model is defined by a simple solid and a size thereof. The simplified model of each object is positioned on the drum field FD based on a position obtained by converting the position coordinates described below into coordinates in the drum coordinate system. In FIG. 5, for example, the player character PC is positioned as the simplified model PCe having a ball on the top of a column at a position on the drum field FD obtained by converting the position coordinates into the coordinates in the drum coordinate system. Further, the object OBJ is positioned as the simplified model OBJe having a triangular pyramid on the top of a column at a position on the drum field FD obtained by converting the position coordinates into the coordinates in the drum coordinate system.

For example, when a player touch-operates the touch panel 15 at a position indicated as a stick 16a, a straight line (marked by dotted lines in FIG. 5) which is obtained by perspective-projecting touch input coordinates obtained by the touch-operation into the game space along the line of sight direction extending radially from the virtual camera C, intersects or contacts the simplified model PCe. At this time, it is determined that the player character PC corresponding to the simplified model PCe is touch-operated by the player. Further, it is determined that an intersection point TPDa at which the straight line intersects the drum field FD through the simplified model PCe is a point on the drum coordinate system field touch-operated by the player.

When the player touch-operates the touch panel 15 at a position indicated as a stick 16b, a straight line which is obtained by perspective-projecting touch input coordinates obtained by the touch-operation into the game space along the line of sight direction extending radially from the virtual camera C, intersects or contacts the simplified model OBJe. At this time, it is determined that the object OBJ corresponding to the simplified model OBJe is touch-operated by the player. Further, it is determined that an intersection point TPDb at which the straight line intersects the drum field FD through the simplified model OBJe is a point on the drum coordinate system field touch-operated by the player.

When the player touch-operates the touch panel 15 at a position indicated as a stick 16c, a straight line which is obtained by perspective-projecting touch input coordinates obtained by the touch-operation into the game space along the line of sight direction extending radially from the virtual camera C directly intersects the drum field FD. At this time, it is determined that an intersection point TPDc at which the straight line intersects the drum field FD is a point on the drum coordinate system field touch-operated by the player. In this case, it is determined that there are no character and object having been touch-operated by the player.

When the player touch-operates the touch panel 15 at a position indicated as a stick 16d (that is, when the player touch-operates the game image displayed as the background), a straight line which is obtained by perspective-projecting touch input coordinates obtained by the touch-operation into the game space along the line of sight direction extending radially from the virtual camera C directly intersects the virtual wall W. At this time, it is determined that an intersection point TPDd at which the straight line intersects the virtual wall W is a point on the drum coordinate system field touch-operated by the player. Also in this case, it is determined that there are no character and object having been touch-operated by the player.

In FIG. 6, the game apparatus 1 converts coordinates in the drum coordinate system into coordinates in the plane coordinate system when performing a process for causing a character to move or perform an action. The aforementioned process is performed in the plane coordinate system and thereafter the position coordinates for each object are converted into coordinates in the drum coordinate system again so as to position rendering models on the drum field FD and generate game images to be displayed on the second LCD 12 as shown in FIG. 4.

For example, a cylinder axis direction of the drum field FD is converted into an X-axis direction of the plane coordinate system. Further, a circumferential direction of the cylindrically curved surface in the drum field FD is converted into a Z-axis direction of the plane coordinate system. Further, a radial direction which is perpendicular to the cylinder axis and away from the cylindrically curved surface of the drum field FD is converted into a Y-axis direction of the plane coordinate system. As a result of the conversion, a plane field FP obtained by spreading the cylindrically curved surface of the drum field FD so as to be a plane of Y=0 is set so as to have the plane coordinate system. In the present embodiment, a coordinate in the cylinder axis direction of the drum field FD is converted as it is into the X-axis coordinate of the plane coordinate system. Further, a coordinate in the circumferential direction of the drum field FD is converted into the Z-axis coordinate of the plane coordinate system such that a length of the entire circumference or a length of a portion of the circumference of the cylindrically curved surface of the drum field FD is set as the length in the Z-axis direction of the plane coordinate system.

The virtual wall W intersects the cylindrically curved surface so as to stand, parallel to the touch panel 15 (clipping plane), on the cylindrically curved surface of the drum field FD as shown in FIG. 5. Accordingly, a plane field Wp corresponding to the virtual wall W is set in the plane coordinate system. A line of intersection of the plane field Wp and the plane field FP is a straight line (Y=0, Z=Zw (a constant value)) in the plane coordinate system into which a line of intersection of the virtual wall W and the cylindrically curved surface is converted according to the aforementioned coordinate conversion. The plane field Wp is a plane having Z=Zw (constant value) and standing on the straight line in the Y-axis direction. Thereby, coordinates on the virtual wall W in the drum coordinate system are converted into coordinates on the plane field Wp. Specifically, a coordinate in the cylinder axis direction along the virtual wall W is converted into the X-axis coordinate in the plane coordinate system. A length from the line of intersection of the drum field FD and the virtual wall W in the direction perpendicular to the cylinder axis along the virtual wall W, is converted into the Y-axis coordinate in the plane coordinate system. Further, a coordinate on the virtual wall W is converted into the Z-axis coordinate Zw in the plane coordinate system.

Here, as shown in FIG. 6, the respective objects are positioned on the plane field FP according to object data (position coordinates) described below. In FIG. 6, for example, the player character PC is positioned at position coordinates PCP (Xpc, Ypc, Zpc) in the plane field FP. The object OBJ is positioned at position coordinates OBJP (Xobj, Yobj, Zobj) in the plane field FP. Further, the aforementioned intersection point TPDa on the drum field FD touch-operated by the player is converted into an intersection point TPPa according to the aforementioned coordinate conversion manner. The aforementioned intersection point TPDb on the drum field FD touch-operated by the player is converted into an intersection point TPPb according to the aforementioned coordinate conversion manner. The aforementioned intersection point TPDc on the drum field FD touch-operated by the player is converted into an intersection point TPPc according to the aforementioned coordinate conversion manner. The aforementioned intersection point TPDd on the virtual wall W touch-operated by the player is converted into an intersection point TPPd on the plane field Wp according to the aforementioned coordinate conversion manner, and thereafter the intersection point TPPd is converted into a target point TG of Y=0, that is, the intersection point TPPd is moved in the negative Y-axis direction along the plane field Wp.

In FIG. 7, a conversion range A1 is set for the player character PC. The conversion range A1 is set on the plane field FP as a sector-shaped range having as a radius a predetermined distance from the front side of the player character PC, a predetermined angle between the facing direction of the player character PC and a direction offset to the right side of the facing direction and the same predetermined angle between the facing direction of the player character PC and a direction offset to the left side of the facing direction. For example, the conversion range A1 is set as a sector-shaped range having as a radius a distance L1 from the front side of the player character PC, an angle θ1 between the facing direction of the player character PC and a direction offset to the right side of the facing direction, and the angle θ1 between the facing direction of the player character PC and a direction offset to the left side of the facing direction. When an action target (non-player character NPC) is in the conversion range A1, the player character PC performs an action (conversation action) for making a conversation with the action target (non-player character NPC).

In FIG. 8, a call range A2 is set for the player character PC. The call range A2 is set on the plane field FP as a sector-shaped range having as a radius a predetermined distance from the front side of the player character PC, a predetermined angle between the facing direction of the player character PC and a direction offset to the right side of the facing direction and the same predetermined angle between the facing direction of the player character PC and a direction offset to the left side of the facing direction. For example, the call range A2 is set as a sector-shaped range having as a radius a distance L2 (L1<L2) from the front side of the player character PC, an angle θ2 (θ1≦θ2) between the facing direction of the player character PC and a direction offset to the right side of the facing direction, and the angle θ2 between the facing direction of the player character PC and a direction offset to the left side of the facing direction. When an action target (non-player character NPC) is in the call range A2, the player character PC performs an action (call action) for calling the action target (non-player character NPC).

In FIG. 9, an action range A3 is set for the player character PC. The action range A3 is set on the plane field FP as a sector-shaped range having as a radius a predetermined distance from the front side of the player character PC, a predetermined angle between the facing direction of the player character PC and a direction offset to the right side of the facing direction, and the same predetermined angle between the facing direction of the player character PC and a direction offset to the left side of the facing direction. For example, the action range A3 is set as a sector-shaped range having as a radius a distance L3 from the front side of the player character PC, an angle θ3 between the facing direction of the player character PC and a direction offset to the right side of the facing direction, and the angle θ3 between the facing direction of the player character PC and a direction offset to the left side of the facing direction. When an action target (the object OBJ, the non-player character NPC, or the plane field FP) is in the action range A3, the player character PC performs an action according to the action target (the object OBJ, the non-player character NPC, or the plane field FP) or an equipment held by the player character PC. While the action range A3 is set as a sector-shaped range in front of the player character PC, the angle θ3 and the distance L3 may be changed depending on a type of the action target and an equipment held by the player character PC.

FIG. 10 shows examples of actions each of which is determined based on a combination of a target touch-operated in the action range A3 and an equipment held by the player character PC. While the action is realized by branching a process flow, the action may be processed with reference to a table containing actions to be performed according to the combinations. For example, when the player character PC has a shovel and the touch-operated target is a ground (plane field FP) in the action range A3, the player character PC digs the ground (plane field FP) with the shovel. When the player character PC has an ax and the touch-operated target is a tree (object OBJ) in the action range A3, the player character PC cuts the tree (object OBJ) with the ax. When the player character PC has a fishing rod and the touch-operated target is a river (plane field FP) in the action range A3, the player character PC does some fishing in the river (plane field FP) with the fishing rod. The aforementioned target on which a specific action is to be performed according to the combination of the equipment (item) of the player character PC and the touch-operated target in the action range A3 is referred to as an action target of the item. Further, regardless of the equipment held by the player character PC, when the touch-operated target is a mailbox (object OBJ) in the action range A3, the player character PC always opens the mailbox (object OBJ). The common action to be performed on the touch-operated target in the action range A3 regardless of the equipment held by the player character PC is referred to as a normal action, and a target on which the normal action is to be performed is referred to as a normal action target. With reference to FIG. 10, a case where the target in the action range A3 is touch-operated is described. However, also when the player character PC is touch-operated in the case of the target being in the action range A3 thereof, the player character PC may performs a similar action according to the combination.

Thus, while an action of the player character PC is determined according to the combination of the target and the equipment, a size of the action range A3 is preferably changed according to the combination. For example, when the player character PC performs an action using the fishing rod, the distance (L3) of the action range A3 is preferably set so as to be longer, as compared to a case where the player character PC performs an action using the shovel, thereby providing a natural action. Thus, the action range A3 can have a size varying depending on characteristics of the character and the equipment, a type of the target, and the like.

On the other hand, according to some of the combinations of the equipment of the player character PC and the type of the target in the action range A3, the player character PC may be caused to perform no specific action. For example, when the player character PC has a shovel and the touch-operated target is a tree (object OBJ) in the action range A3, the player character PC is moved. When the player character PC has an ax and the touch-operated target is a ground or a river (plane field FP) in the action range A3, the player character PC is moved. Further, when the player character PC has a fishing rod and the touch-operated target is a ground (plane field FP), a tree (object OBJ), or a rock (object OBJ) in the action range A3, the player character PC is moved.

In FIG. 11, when the touch-operated target does not make such a combination with the equipment held by the player character PC as to cause the aforementioned specific action or normal action to be performed, the player character PC is caused to move, at a predetermined speed, toward a target point TG which is an intersection point TPP (see FIG. 6) on the plane field FP having been touch-operated. Here, when the touch-operated target is the virtual wall W, the touch input coordinates are converted into the target point TG on the plane field FP as described above. Therefore, the player character PC is caused to move toward the target point TG.

Figure 12:
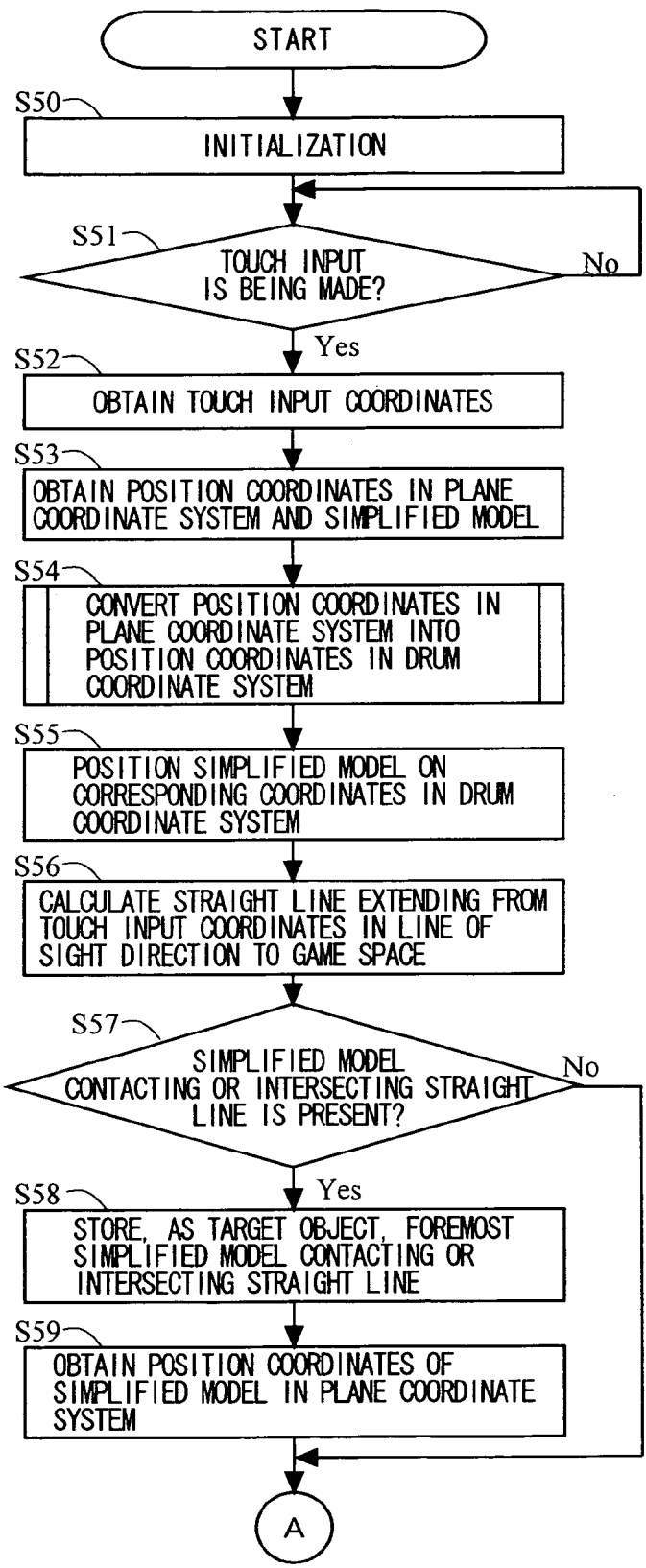
FIG. 12 is a flow chart illustrating a former part of the game process performed by the game apparatus 1 by executing the game program according to an embodiment.
Figure 13:
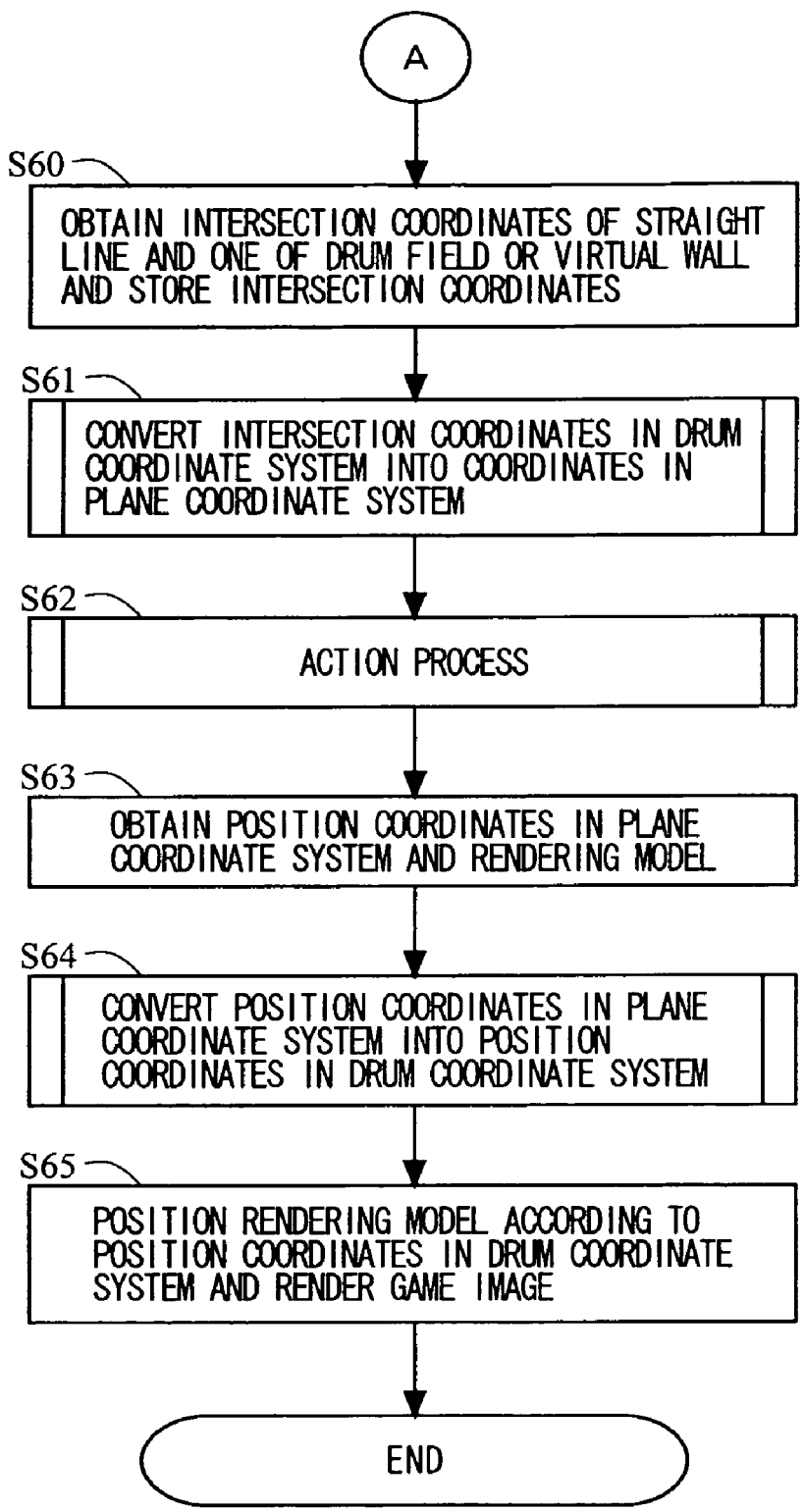
FIG. 13 is a flow chart illustrating a latter part of the game process performed by the game apparatus 1 by executing the game program according to an embodiment.
Figure 14:
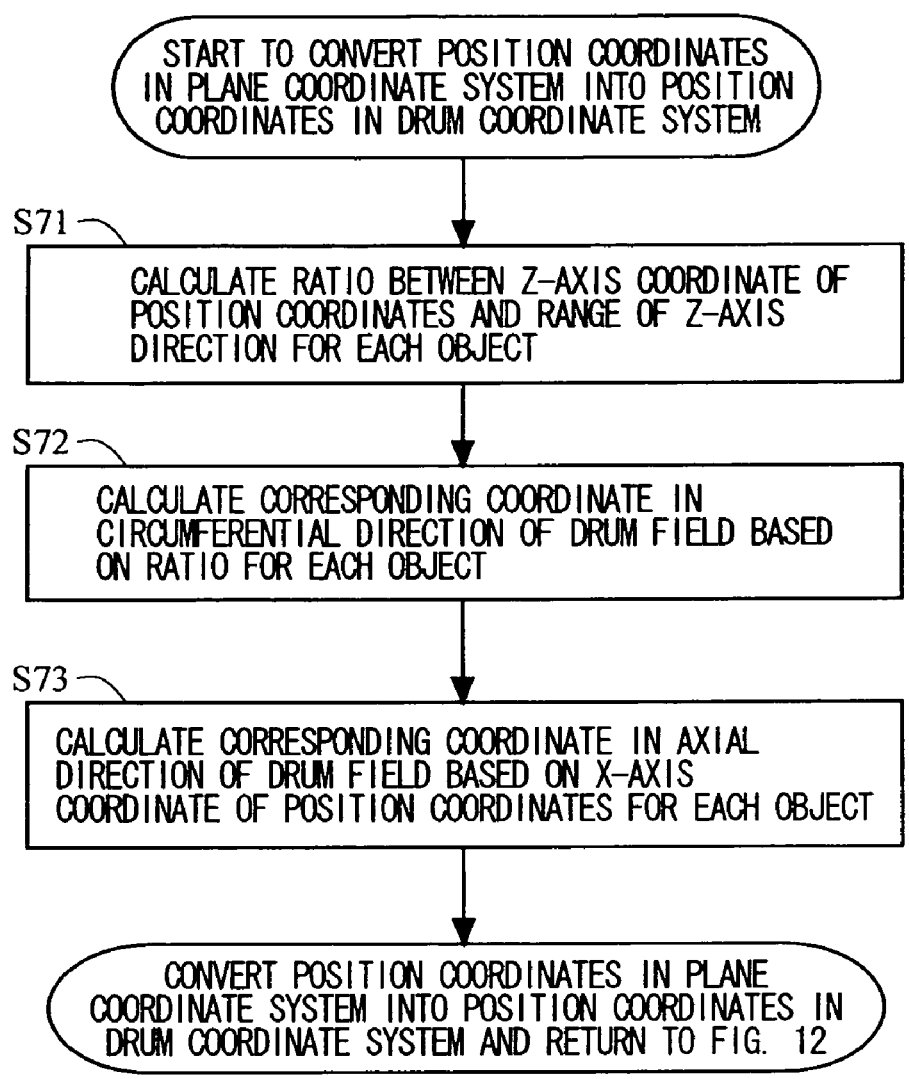
FIG. 14 shows in detail a subroutine of a process for converting position coordinates in the plane coordinate system into position coordinates in the drum coordinate system as shown in step 54 of FIG. 12 and step 64 of FIG. 13.
Figure 15:
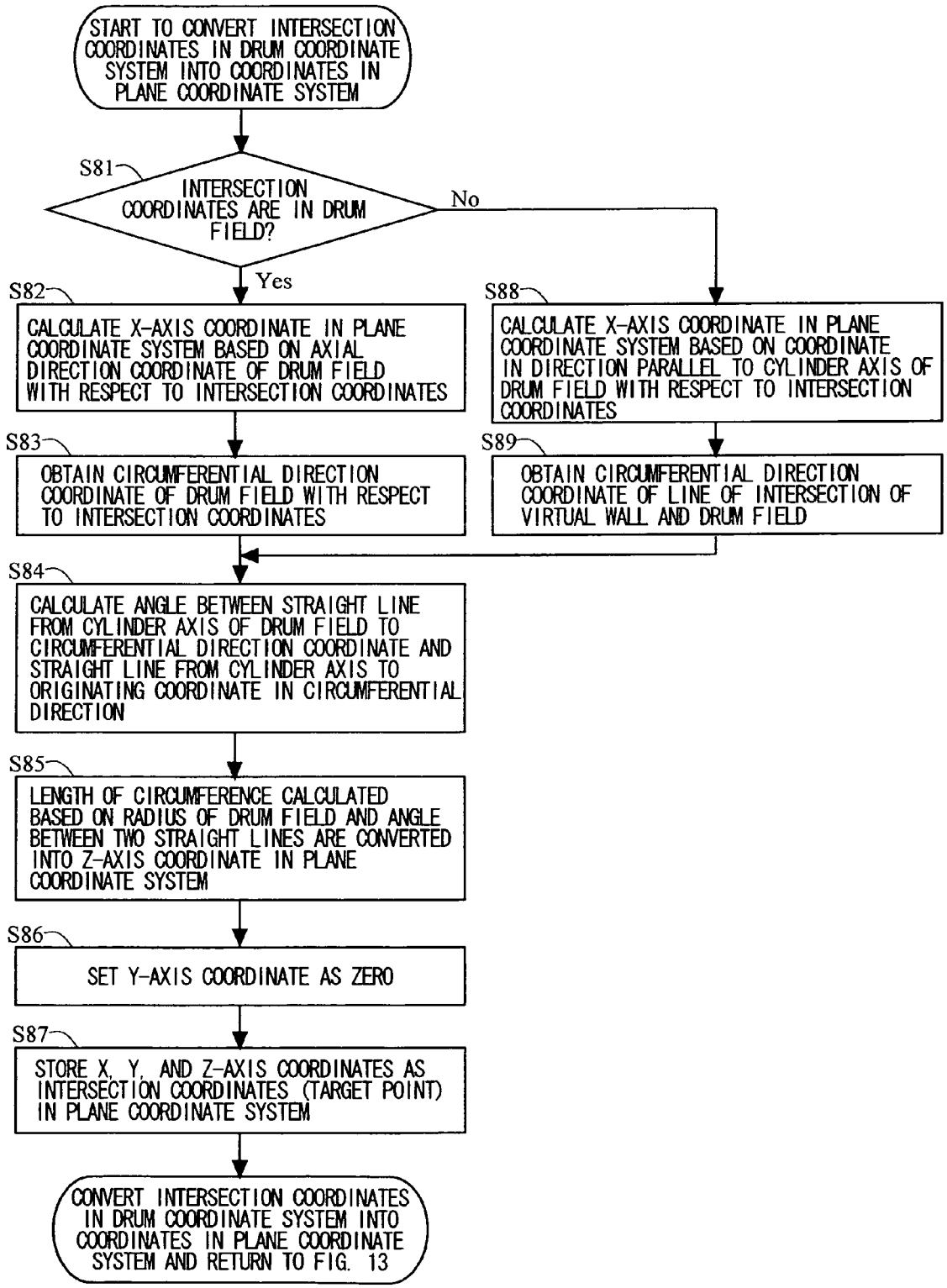
FIG. 15 shows in detail a subroutine of a process for converting intersection coordinates in the drum coordinate system into coordinates in the plane coordinate system as shown in step 61 of FIG. 13.
Figure 16:
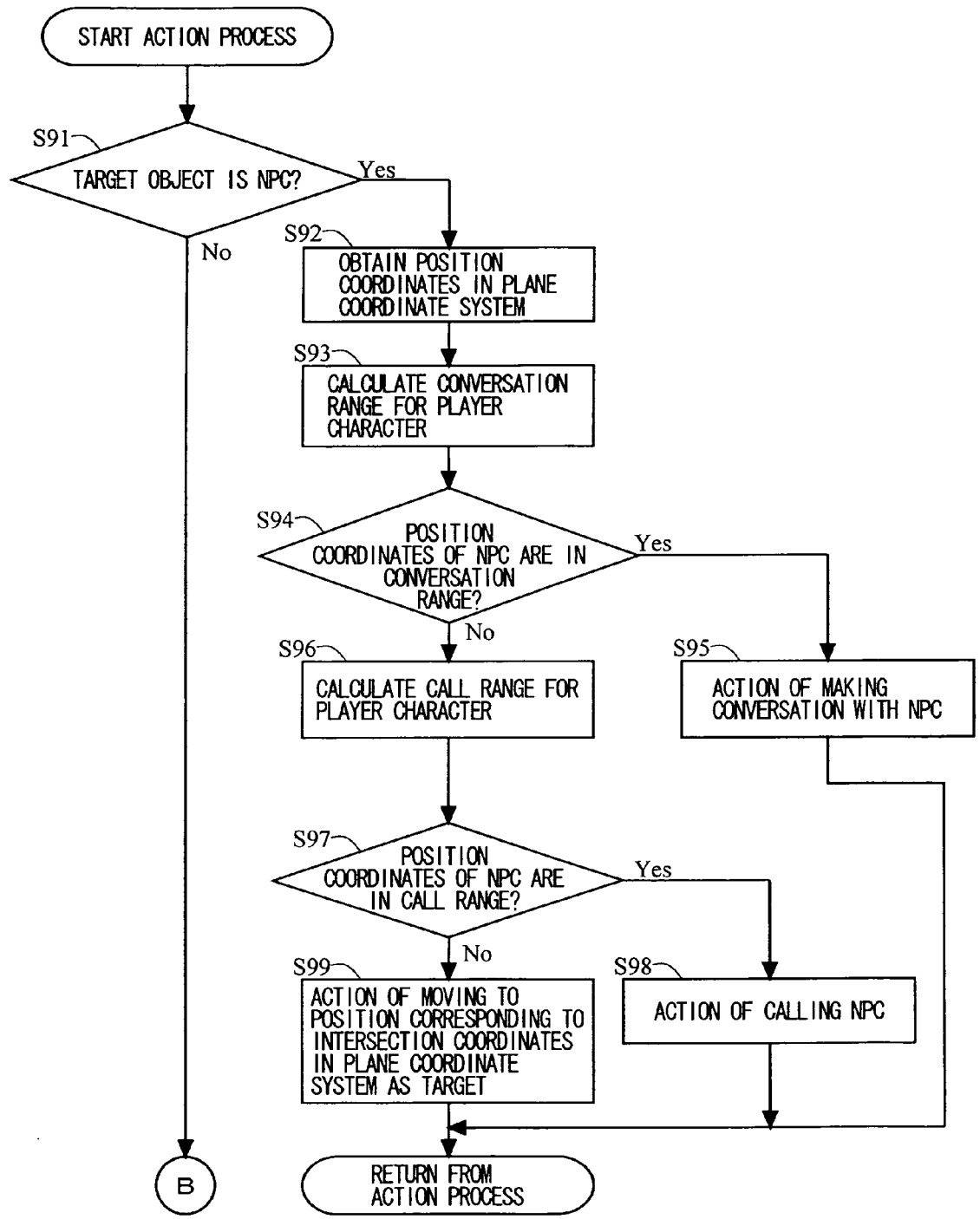
FIG. 16 shows in detail a subroutine of a former part of the action process of step 62 shown in FIG. 13.
Figure 17:
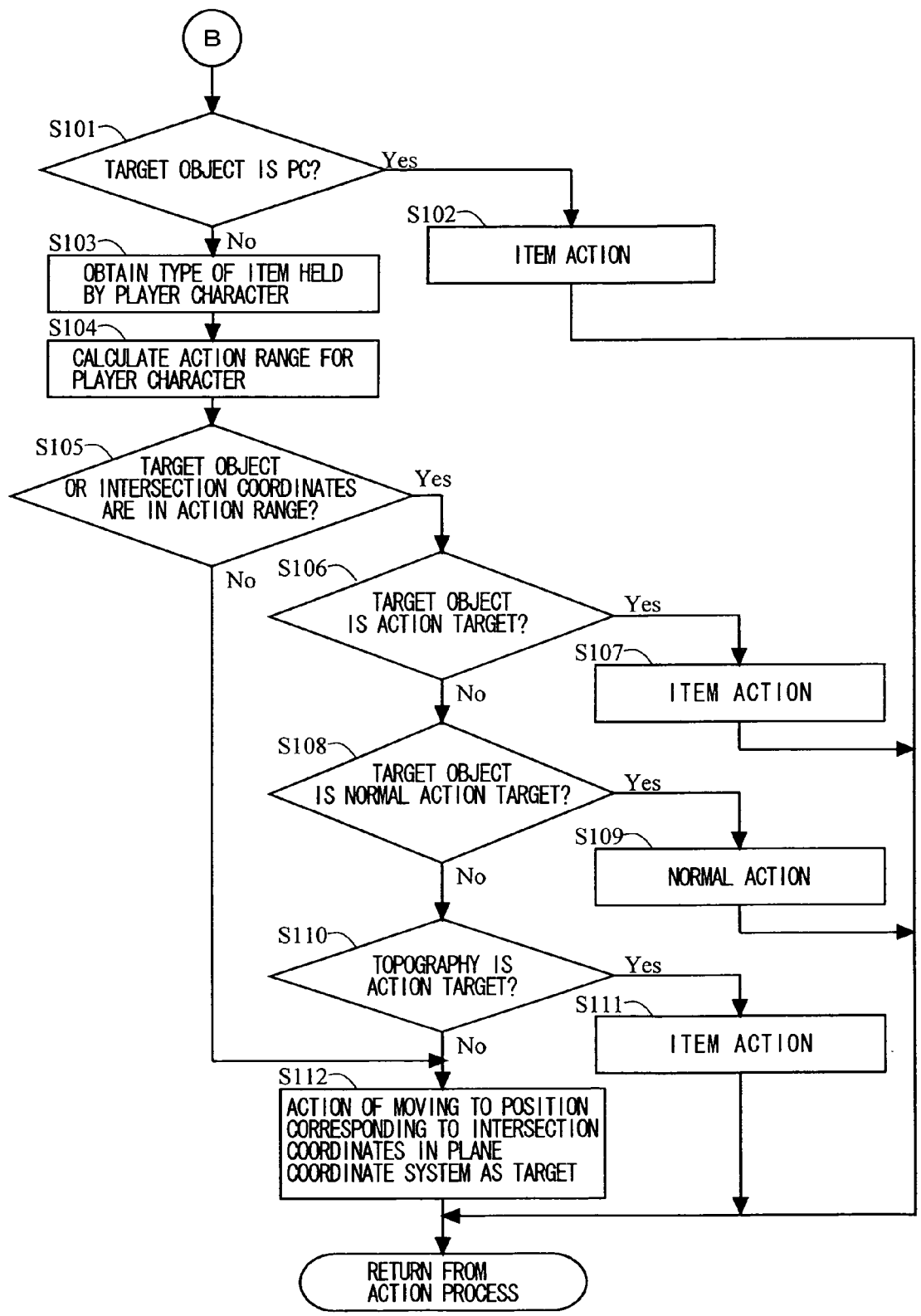
FIG. 17 shows in detail a subroutine of a latter part of the action process of step 62 shown in FIG. 13.
Figure 18:
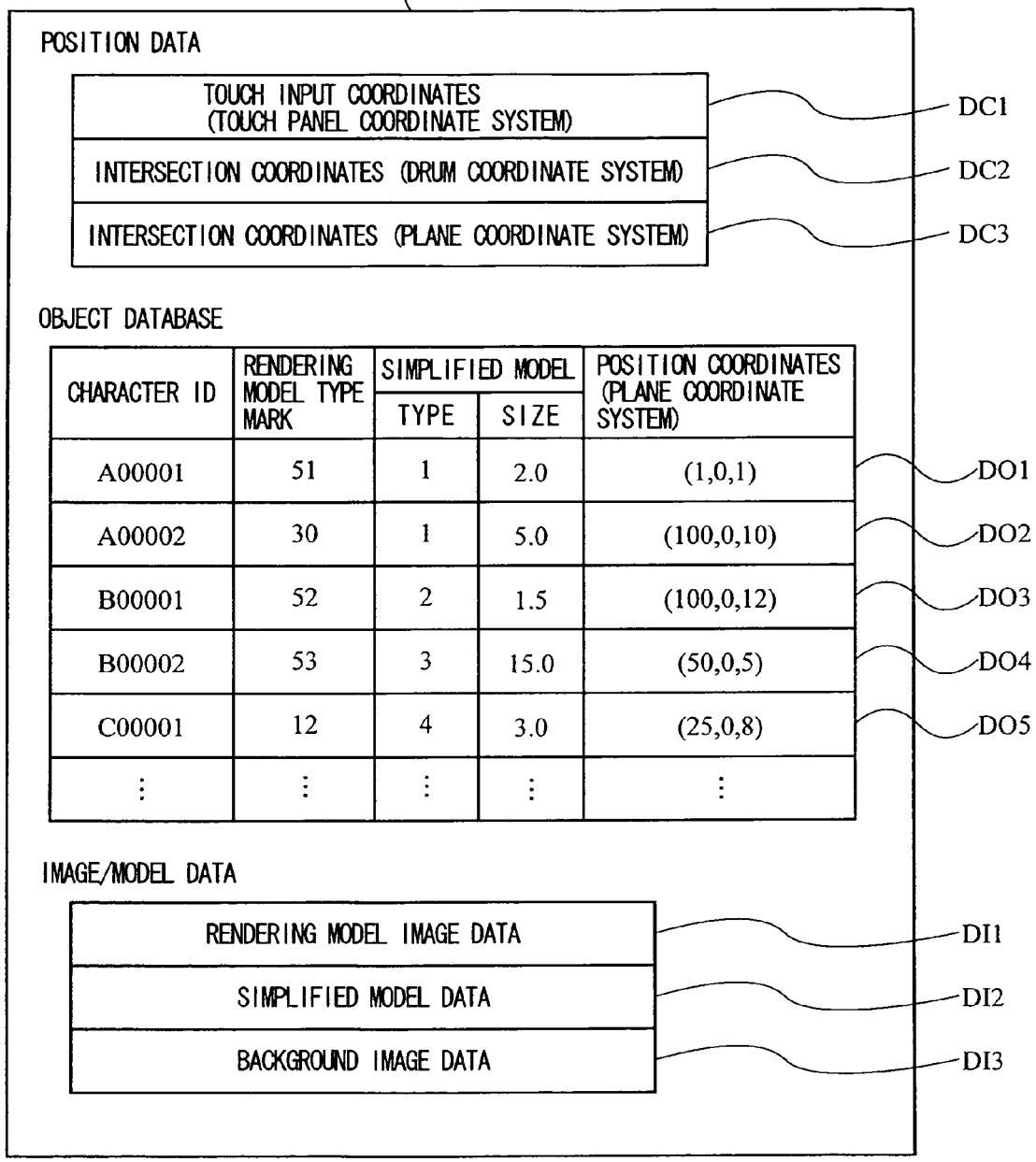
FIG. 18 is a diagram illustrating examples of various data to be stored in a RAM 24 during the processes shown in FIGS. 12 and 13.

Next, with reference to FIGS. 12 to 18, a process performed by the game apparatus 1 executing the game program will be specifically described. FIG. 12 is a flow chart illustrating a former part of the game process performed by the game apparatus 1 by executing the game program. FIG. 13 is a flow chart illustrating a latter part of the game process performed by the game apparatus 1 by executing the game program. FIG. 14 shows in detail a subroutine of a process for converting position coordinates in the plane coordinate system into position coordinates in the drum coordinate system as shown in step 54 of FIG. 12 and step 64 of FIG. 13. FIG. 15 shows in detail a subroutine of a process for converting intersection coordinates in the drum coordinate system into coordinates in the plane coordinate system as shown in step 61 of FIG. 13. FIG. 16 shows in detail a subroutine of a former part of the action process of step 62 shown in FIG. 13. FIG. 17 shows in detail a subroutine of a latter part of the action process of step 62 shown in FIG. 13. FIG. 18 is a diagram illustrating examples of various data to be stored in the RAM 24 during the processes shown in FIGS. 12 and 13. The program for executing the processes are contained in the game program stored in the ROM 17a, and when the game apparatus 1 is turned on, the program is loaded from the ROM 17a to the RAM 24 and executed by the CPU core 21.

Initially, when the power supply (not shown) of the game apparatus 1 is turned on, the CPU core 21 executes a boot program (not shown), whereby the game program stored in the memory card 17 is loaded to the RAM 24. The game program having been loaded is executed by the CPU core 21, whereby the steps (a step is abbreviated as "S" in FIGS. 12 to 17) shown in FIGS. 12 and 13 are executed.

In FIG. 12, the CPU core 21 performs an initialization for the game in step 50, and advances the process to the next step. For example, as the initialization performed in step 50, the CPU core 21 sets up data relating to objects which appear in the game space. As shown in FIG. 18, in the initialization, object data D01, D02, ..., D05, ... corresponding to the respective objects, and the like are stored in the RAM 24 as object database used for positioning the respective objects in the game space. Each of the object data D0, D02, ..., D05, ... contains a character ID, a rendering model type mark, a type and a size of a simplified model, and data indicating position coordinates. The character ID is a number which is assigned individually to each object and which enables a type of the object to be identified (that is, it indicates whether the object is a player character, a non-player character, another object or the like). The rendering model type mark is a mark for designating rendering model image data DI1 for each object to be positioned in the drum field FD when a game image is generated. The type and the size of the simplified model represent marks for indicating, for each object, the respective type and size of the simplified model data DI2 used for identifying a target object having been touch-operated by the player. The position coordinates represent data indicating a position of each object to be positioned in the plane coordinate system as three-dimensional coordinates (X, Y, Z). Further, as necessary, rendering model image data DI1, simplified model data DI2, background image data DI3, and the like are stored in the RAM 24 as image data used for generating a game image and model data used for detecting the touch-operated target. Here, the simplified model data DI2 represents a solid model having a very simplified shape such as a column, a ball, or a cone, as compared to the rendering model image data DI1. The simplified model data DI2 is determined depending on the type of the simplified model contained in the object data DO. The solid model has a size varying depending on the size of the simplified model contained in the object data DO.

Returning to FIG. 12, in step 51, the CPU core 21 waits for a touch input from the touch panel 15 according to a user's operation. When a touch input is made (yes in step 51), the CPU core 21 stores as touch input coordinates DC1 in the RAM 24 coordinates which are in the touch panel coordinate system and which indicate touch position at which the touch panel 15 is being currently touched in step 52, and advances the process to the next step.

For example, as shown in FIG. 18, coordinate data of the touch panel coordinate system inputted from the touch panel 15 is stored in the RAM 24 as touch input coordinates DC1 as necessary. Further, as necessary, intersection coordinates DC2 are stored in the RAM 24 as position data of the drum coordinate system corresponding to the touch input coordinates DC1 and the intersection coordinates DC3 are stored in the RAM 24 as position data in the plane coordinate system corresponding to the intersection coordinates DC2, and the like.

Returning to FIG. 12, the CPU core 21 acquires position coordinates in the plane coordinate system and simplified model (type and size) for each object positioned in the game space based on the object data DO in the object database in step 53. The CPU core 21 converts the position coordinates in the plane coordinate system acquired in step 53 into position coordinates in the drum coordinate system for each object in step 54, and advances the process to the next step. Hereinafter, with reference to FIG. 14, a detailed process of step 54 will be described.

In FIG. 14, for each object, the CPU core 21 calculates a ratio of the Z-axis coordinate of the position coordinates to a range of the Z-axis direction having been previously set in the plane coordinate system in step 71, and advances the process to the next step. Here, the range of the Z-axis direction represents a length in the Z-axis direction of the plane field FP (see FIG. 6) obtained by spreading the whole cylindrically curved surface or a portion of the cylindrically curved surface of the drum field FD (see FIG. 5) so as to be a plane. That is, the range of the Z-axis direction represents a length in the plane coordinate system, the length corresponding to a length of the entire circumference or a length of a portion of the circumference of the cylindrically curved surface of the drum field FD.

Next, in step 72, the CPU core 21 calculates the corresponding coordinate in the circumferential direction of the drum field FD based on the ratio calculated in step 71 for each object, and advances the process to the next step. For example, when the range of the Z-axis direction corresponds to the length of the entire circumference of the cylindrically curved surface, the ratio calculated in step 71 is used as a ratio between the length of the entire circumference and the circumferential length of the corresponding coordinates so as to calculate the circumferential length of the corresponding coordinates. A point which is positively offset by the circumferential length from an originating coordinate point in the circumferential direction of the drum field FD is set as the corresponding coordinate in the circumferential direction of the drum field FD. On the other hand, when the range of the Z-axis direction corresponds to a length of a portion of the circumference of the cylindrically curved surface, the ratio calculated in step 71 is used as a ratio between the length of the portion of circumference and the circumferential length of the corresponding coordinates so as to calculate the circumferential length of the corresponding coordinates. A point which is positively offset by the circumferential length from an originating coordinate point in the circumferential direction of the drum field FD is set as the corresponding coordinate in the circumferential direction of the drum field FD.

Next, for each object, the CPU core 21 calculates, based on the X-axis coordinate of the position coordinates, the corresponding coordinate in the axial direction of the drum field FD in step 73, and ends the process according to the subroutine. For example, the X-axis coordinate of the position coordinates for each object is set as it is as the corresponding coordinate in the axial direction of the drum field FD based on the originating coordinate in the axial direction of the drum field FD. Using a predetermined conversion equation, the X-axis coordinate of the position coordinates for each object may be converted into the corresponding coordinate in the axial direction of the drum field FD. In the aforementioned processes of steps 71 to 73, the position coordinates in the plane coordinate system for each object are converted into the coordinates in the drum coordinate system on the cylindrically curved surface of the drum field FD. In the aforementioned processes of steps 71 to 73, a position coordinate (that is, $Y=0$) on the plane field FP is converted into the corresponding coordinate on the cylindrically curved surface of the drum field FD. However, needless to say, when the position coordinate is away from the plane field FP in the Y-axis direction (that is, $Y>0$), the Y-axis coordinate is converted as it is into the corresponding coordinate in the radial direction which is perpendicular to the cylinder axis and away from the cylindrically curved surface of the drum field FD, whereby a point which is not on the plane field FP can be similarly converted into the corresponding coordinate in the drum coordinate system.

Returning to FIG. 12, in step 55, the CPU core 21 is operable to position the respective simplified models according to the corresponding coordinates in the drum coordinate system calculated in step 54, and advances the process to the next step. Specifically, the CPU core 21 generates each of the simplified models based on the type and the size of the simplified model contained in the object data DO and positions each of the simplified models at a position of the corresponding coordinates in the game space of the drum coordinate system (see FIG. 5). In step 55, the simplified models corresponding to the player character PC, the non-player character NPC, and the other objects OBJ appearing in the game space are positioned in the game space of the drum coordinate system.

Next, the CPU core 21 calculates a straight line obtained by perspective-projecting the touch input coordinates DC1 into the game space of the drum coordinate system along the line of sight direction radially extending from the virtual camera C in step 56 (marked by dotted line of FIG. 5). In step 57, the CPU core 21 determines whether or not a simplified model contacts or intersects the straight line calculated in step 56. When it is determined that a simplified model contacts or intersects the straight line, the CPU core 21 advances the process to the next step 58. On the other hand, when it is determined that no simplified model contacts or intersects the straight line, the CPU core 21 advances the process to the next step 60 shown in FIG. 13.

In step 58, the CPU core 21 stores in the RAM 24 an object (character ID) corresponding to the foremost (as seen from the virtual camera C) simplified model (that is, the simplified model closest to the virtual camera C) among simplified models which are determined as contacting or intersecting the straight line. The CPU core 21 acquires, from the object database, position coordinates in the plane coordinate system for the object (character ID) corresponding to the foremost simplified model in step 59, and advances the process to the next step 60 shown in FIG. 13. Hereinafter, the object corresponding to the foremost simplified model contacting or intersecting the straight line is referred to as a touch-operated target object. For example, as shown in FIG. 5, when the touch panel 15 is touch-operated at the position indicated as the stick 16$b$, acquired are the character ID corresponding to the simplified model OBJe intersecting the straight line calculated from the touch input coordinates DC1, and position coordinates thereof in the plane coordinate system, thereby setting the object corresponding to the simplified model OBJe as the touch-operated target object.

In step 60, the CPU core 21 acquires coordinates of intersection of the straight line calculated in step 56 and one of the drum field FD or the virtual wall W, and stores the acquired intersection coordinates as intersection coordinates DC2 in the RAM 24. For example, as shown in FIG. 5, when the touch panel 15 is touch-operated at the positions indicated as the sticks 16$a$ to 16$c$, intersection coordinates TPDa to TPDc at which the drum field FD intersects the straight line calculated from the touch input coordinates DC1 are obtained, respectively. Further, as shown in FIG. 5, when the touch panel 15 is touch-operated at the position indicated as the stick 16$d$, the intersection coordinates TPDd at which the virtual wall W intersects the straight line calculated from the touch input coordinates DC1 is obtained. The CPU core 21 converts the intersection coordinates acquired in step 60 into coordinates in the plane coordinate system in step 61, and advances the process to the next step. Hereinafter, with reference to FIG. 15, a detailed process of step 61 will be described.

In FIG. 15, the CPU core 21 determines whether or not the intersection coordinates obtained in step 60 are on the drum field FD in step 81. When it is determined that the intersection coordinates are on the drum field FD, the CPU core 21 advances the process to the next step 82. On the other hand, when it is determined that the intersection coordinates are on the virtual wall W, the CPU core 21 advances the process to the next step 88.

In step 82, the CPU core 21 calculates X-axis coordinate of the plane coordinate system based on the corresponding coordinate in the axial direction of the drum field FD with respect to the intersection coordinates. Next, the CPU core 21 obtains the corresponding coordinate in the circumferential direction of the drum field FD with respect to the intersection coordinates in step 83, and advances the process to the next step 84. The process of step 82 is the inverse of the conversion performed in step 73. Accordingly, for example, the corresponding coordinate in the axial direction of the drum field FD based on the original coordinate in the axial direction of the drum field FD is set as it is as X-axis coordinate in the plane coordinate system. Further, the corresponding coordinate in the axial direction of the drum field FD may be converted into the X-axis coordinate in the plane coordinate system using a predetermined conversion equation.

On the other hand, in step 88, the CPU core 21 calculates the X-axis coordinate in the plane coordinate system based on the coordinate in the direction parallel to the cylinder axis of the drum field FD with respect to the intersection coordinates. Next, the CPU core 21 obtains the corresponding coordinate in the circumferential direction of the drum field FD with respect to the line of intersection of the virtual wall W and the cylindrically curved surface of the drum field FD in step 89, and advances the process to the next step 84. As described with reference to FIG. 5, the virtual wall W is disposed so as to stand on the cylindrically curved surface of the drum field FD parallel to the touch panel 15 (clipping plane) and intersect the cylindrically curved surface. That is, in step 88, the corresponding coordinate in the same direction as the axial direction of the drum field FD with respect to the virtual wall W is calculated. Further, in step 89, obtained is the corresponding coordinate in the circumferential direction at which the virtual wall W intersects the drum field FD.

In step 84, the CPU core 21 calculates, based on the corresponding coordinate in the circumferential direction of the drum field FD calculated in step 83 or step 89, an angle between a straight line from the cylinder axis to the corresponding coordinate in the circumferential direction and a straight line from the cylinder axis to the originating coordinate in the circumferential direction of the drum field FD. The CPU core 21 calculates, based on the radius of the drum field FD and the angle calculated in step 84, the circumferential length corresponding to the angle. In step 85, the CPU core 21 converts the calculated circumferential length into the Z-axis coordinate based on the range of the Z-axis direction and a ratio between the calculated circumferential length and a length of the entire circumference of the cylindrically curved surface of the drum field FD or a length of a portion of the circumference of the cylindrically curved surface of the drum field FD, the length of the entire circumference or the length of a portion of the circumference corresponding to the range of the z-axis direction, and advances the process to the next step. Here, the process of step 85 is the inverse of the conversion performed in step 71 and step 72.

Next, the CPU core 21 sets, as zero, Y-axis coordinate in the plane coordinate system for the intersection coordinates in step 86. Instep 87, the CPU core 21 stores, as the intersection coordinates DC3 in the plane coordinate system, the X-axis coordinate calculated in step 82 or step 88, the Z-axis coordinate calculated in step 85, and the Y-axis coordinate set in step 86 in the RAM 24, and ends the process of the subroutine. For example, in the processes of steps 81 to 89, the intersection coordinates TPDa to TPDc shown in FIG. 5 are converted into the intersection coordinates (target points) TPPa to TPPc shown in FIG. 6, respectively. Further, in the processes of steps 81 to 89, the intersection coordinates TPDd shown in FIG. 5 are converted into the target point TG shown in FIG. 6.

Returning to FIG. 13, the CPU core 21 performs an action process for the player character PC based on the touch-operated target object and the intersection coordinates DC3 in step 62, and advances the process to the next step. Hereinafter, with reference to FIGS. 16 and 17, the detailed process of step 62 will be described.

In FIG. 16, the CPU core 21 determines whether or not the touch-operated target object is a non-player character NPC in step 91. When it is determined that the target object is a non-player character NPC, the CPU core 21 advances the process to the next step 92. When it is determined that the target object is not a non-player character NPC, the CPU core 21 advances the process to the next step 101 shown in FIG. 17. Here, the CPU core 21 can identify the type of the target object based on the character ID of the target object obtained in step 58.

In step 92, the CPU core 21 obtains position coordinates in the plane coordinate system for the non-player character NPC which is the touch-operated target object. The position coordinates are the same as the position coordinates obtained in step 59. The CPU core 21 obtains the position coordinates and the direction of the player character PC with reference to the object database, and calculates the conversation range A1 for the player character PC in step 93 (see FIG. 7), and advances the process to the next step.

Next, the CPU core 21 determines whether or not the position coordinates of the non-player character NPC obtained in step 92 are in the conversation range A1 in step 94. When it is determined that the position coordinates of the non-player character NPC are outside the conversion range A1, the CPU core 21 advances the process to the next step 96. On the other hand, when it is determined that the position coordinates of the non-player character NPC are in the conversation range A1, the CPU core 21 performs an action process for representing an action of the player character PC having a conversation with the non-player character NPC which is the touch-operated target in step 95, and ends the process according to the subroutine. Here, the action of the player character PC having a conversation with the non-player character NPC is an action process for representing as a game image an action of the player character PC and the non-player character NPC exchanging some words therebetween.

In step 96, the CPU core 21 calculates the call range A2 for the player character PC based on the position coordinates and the direction of the player character PC (see FIG. 8). Next, the CPU core 21 determines whether or not the position coordinates of the non-player character NPC obtained in step 92 are in the call range A2 in step 97. When it is determined that the position coordinates of the non-player character NPC are in the call range A2, the CPU core 21 performs an action process for representing an action of the player character PC calling the non-player character NPC which is the touch-operated target in step 98, and ends the process according to the subroutine. Here, the action of the player character PC calling the non-player character NPC is an action process for representing as a game image an action of only the player character PC speaking to the non-player character NPC which is further away from the player character PC as compared to a distance which is appropriate for making a conversation between the player character PC and the non-placer character NPC.

On the other hand, when it is determined that the position coordinates of the non-player character NPC are outside the call range A2, the CPU core 21 performs an action process for moving the player character PC to the target point TG of the intersection coordinates DC3 on the plane field FP at a predetermined speed in step 99 (see FIG. 11), and ends the process according to the subroutine. Specifically, in the movement action of step 99, the CPU core 21 performs an action for moving the player character PC to the intersection coordinates DC3 at the predetermined speed so as to update the position coordinates of the player character PC in the object database.

In FIG. 17, when it is determined that the target object is not a non-player character NPC, the CPU core 21 determines whether or not the touch-operated target object is the player character PC in step 101. When it is determined that the target object is not a player character PC, the CPU core 21 advances the process to the next step 103. On the other hand, when it is determined that the target object is the player character PC, the CPU core 21 performs an action process for causing the player character PC to perform an action using the equipment thereof, and the like in step 102, and ends the process according to the subroutine. Specifically, when the player touch-operates the player character PC, the player character PC is caused to perform an action using an item held by the player character PC and the like toward the direction in which the player character PC is currently facing, regardless of whether or not an action target is in the direction in which the player character PC is facing. For example, when the player character PC having an ax as the item is touch-operated, the player character PC performs an action of swinging the ax toward the direction in which the player character PC is currently facing. Further, when the player character PC having no item is touch-operated and there is a tree (object OBJ) near the front thereof, the player character PC performs such an action as to shake the tree.

In step 103, the CPU core 21 obtains a type of an item currently held by the player character PC. The CPU core 21 obtains the position coordinates and the direction of the player character PC with reference to the object database, and calculates the action range A3 for the player character PC according to the combination of the type of the item and one of the touch-operated target object or a plane field FP type indicated by the intersection coordinates DC3 in step 104 (see FIG. 9), and advances the process to the next step. Here, the CPU core 21 calculates a standard action range A3 based on the position coordinates and the direction of the player character PC, and changes the size of the action range A3 depending on the combination of the type of the item and one of the touch-operated target object or the plane field FP type indicated by the intersection coordinates DC3. For example, when the player character PC has a fishing rod and the type of the plane field FP having been touch-operated represents a river, the CPU core 21 changes the action range A3 so as to be wider as compared to a case where the player character PC has a fishing rod and a mailbox is the touch-operated target object.

Next, in step 105, the CPU core 21 determines whether or not one of the position coordinates of the touch-operated target object obtained in step 59 or the intersection coordinates DC3 are in the action range A3. When it is determined that one of the position coordinates of the target object or the intersection coordinates DC3 are in the action range A3, the CPU core 21 advances the process to the next step 106. When it is determined that neither the position coordinates of the target object nor the intersection coordinates DC3 are in the action range A3, the CPU core 21 advances the process to the next step 112.

In step 106, the CPU core 21 determines whether or not the target object in the action range A3 is an action target of the item held by the player character PC (see FIG. 10). When it is determined that the target object is not the action target of the item held by the player character PC, the CPU core 21 advances the process to the next step 108. On the other hand, when it is determined that the target object is the action target of the item held by the player character PC, the CPU core 21 performs an action process for causing the player character PC to perform an action specific to the touch-operated target object in step 107, and ends the process according to the subroutine.

The action target of the item determined as the target object in step 106 is an object on which the player character PC performs a specific action using the item. In FIG. 10, for example, when the player character PC has a "shovel", a "rock" which "repels" the shovel, or the like, is an action target for the "shovel" (item). Further, when the player character PC has an "ax", a "tree" which is "cut" by the ax, a "rock" and a "tree" which "repel" the ax, or the like, is an action target for the "ax" (item). Moreover, when the player character PC has a "fishing rod", no object is determined as the action target. Thus, based on the combination of the item and the target object in the action range A3, it is determined whether or not the target object in the action range A3 is an action target in step 106. On the other hand, when a target object which does not make a combination with the item with which the player character PC performs a specific action thereon (for example, "shovel" against "tree") is in the action range A3, the target object is determined as being not the action target in step 106. In step 107, performed is the action process for representing as a game image a specific action according to the combination of the item and the target object in the action range A3.

In step 108, the CPU core 21 determines whether or not the target object in the action range A3 is a normal action object (see FIG. 10) on which a same action is performed regardless of whether or not the player character PC has an item and what the type of the item is. When it is determined that the target object is not the normal action target, the CPU core 21 advances the process to the next step 110. On the other hand, when it is determined that the target object is the normal action target (for example, a "mailbox" in FIG. 10), the CPU core 21 performs an action process for causing the player character PC to perform a common action on the touch-operated target object (normal action; for example, "open the mailbox") in step 109, and ends the process according to the subroutine.

In step 110, the CPU core 21 determines whether or not the type (hereinafter, referred to as a topography) of the plane field FP indicated by the intersection coordinates DC3 in the action range A3 represents an action target of the item held by the player character PC. When the topography is not the action target of the item held by the player character PC, the CPU core 21 advances the process to the next step 112. On the other hand, when the topography is the action target of the item held by the player character PC, the CPU core 21 performs an action process for causing the player character PC to perform a specific action on the plane field FP indicated by the intersection coordinates DC3 in step 111, and ends the process according to the subroutine.

When the action target of the item is determined in step 110, it is determined what type the plane field FP on which the player character PC performs a specific action using the item has. In FIG. 10, for example, when the player character PC has a "shovel", the "ground" in which the player character PC "digs a hole" with the "shovel", a "river" in which the player character PC "swings" the "shovel", or the like is an action target for the "shovel" (item). Further, when the player character PC has a "fishing rod", a "river" in which the player character PC "does some fishing" with the "fishing rod" or the like is an action target for the "fishing rod" (item). Thus, based on the combination of the item and the type of the plane field FP indicated by the intersection coordinates DC3 in the action range A3, it is determined whether or not the type of the plane field FP is the action target in step 110. On the other hand, a topography which does not make a combination with the item with which the player character PC performs a specific action thereon (for example, "ax" against "ground") is determined as being not the action target in step 110. In step 111, the action process is performed for representing as a game image a specific action performed according to the combination of the item and the topography represented by the intersection coordinates DC3 in the action range A3.

In step 112, the CPU core 21 performs an action process for moving the player character PC on the plane field FP to the target point TG of the intersection coordinates DC3 at a predetermined speed (see FIG. 11), and ends the process according to the subroutine. The process is the same as step 99, and a detailed description is not given.

Returning to FIG. 13, the CPU core 21 obtains position coordinates in the plane coordinate system and rendering model type mark for each object positioned in the game space based on the object data DO contained in the object database in step 63. In step 64, the CPU core 21 converts position coordinates in the plane coordinate system obtained in step 63 into coordinates in the drum coordinate system for each object, and advances the process to the next step. The process of step 64 for converting position coordinates in the plane coordinate system into coordinates in the drum coordinate system for each object is the same as step 54 shown in FIG. 12. Therefore, a detailed description is not given.

Next, in step 65, the CPU core 21 disposes the respective rendering models and renders a game image using the virtual camera C as a point of view according to the corresponding coordinates in the drum coordinate system calculated in step 64, and ends the process according to the flow chart. Specifically, the CPU core 21 refers to the rendering model image data DI1 based on the rendering model type mark contained in each object data D0, and disposes the rendering model image at a position of the corresponding coordinates in the game space of the drum coordinate system for each object (see FIG. 4). In step 65, the rendering models corresponding to the player character PC, the non-player character NPC, and other objects OBJ, which appear in the game space, are disposed in the game space of the drum coordinate system and are rendered in a game image using the virtual camera C as a point of view.

Thus, in the game process executed by the game apparatus 1, a plurality of determination ranges (conversation range A1, call range A2, and action range A3 varying according to the combination) are set in front of the player character PC, and a different action is represented based on a relationship between the determination range and a position at which the touch panel is touch-operated. Specifically, when the touch-operated position indicates an object or a topography in the determination range, the player character PC is caused to perform a predetermined action on the object or the topography in the determination range. On the other hand, when the touch-operated position is outside the determination range, an action is performed so as to move the player character PC to the touch-operated position as a target destination. Accordingly, a character is caused to perform various actions through the same touch-operation. Further, in the game process executed by the game apparatus 1, the action is changed depending on the combination of the item held by the player character PC and one of a touch-operated object or topography. Accordingly, a character is caused to change actions depending on the item and the touch-operated object through the same touch-operation. Further, a plurality of determination ranges are set according to the items or the touch-operated targets. The size of the determination range can be changed depending on the touch-operated target, item characteristics, and action characteristics (conversation, call and the like). That is, in the game process executed by the game apparatus 1, the determination range can be set according to the characteristics represented in the game space, so as to be realistic, whereby the reality of the action can be increased.

While in the above description the virtual wall W is set so as to be parallel to the near clipping plane (touch panel 15) having the touch panel coordinate system set as shown in FIG. 5, it should be understood that even if the virtual wall W is not parallel to the near clipping plane the touch input coordinates can be similarly perspective-projected. Further, a case where a game image is obtained by perspective-projection from the virtual camera C as shown in FIG. 5 is described in the embodiment. However, the game image may be generated using parallel projection. Further, the game field set in the drum coordinate system is described as a cylindrical drum field FD. However, the game field may be a plane, a ball or the like.

Moreover, in the above description, for the description more specific, the game process is described using a determination range of a specific shape. However, it should be understood that this is merely an example and the shape of the determination range of the present invention is not restricted thereto.

Further, in the aforementioned embodiment, as an example of the liquid crystal display device having two screens, described is a case where the first LCD 11 and the second LCD 12, which are physically separated from each other, are disposed one on top of the other, that is, the liquid crystal display device has the upper screen and the lower screen. However, the display screen may have another structure if the display screen is composed of two screens. For example, the first LCD 11 and the second LCD 12 may be aligned side-by-side on one principal surface of the lower housing 13b. Further, a vertically longer LCD, which has the same width as the second LCD 12 and twice the length of the second LCD 12 (that is, the LCD is a physically single LCD but has a size of two display screens), may be disposed on one principal surface of the lower housing 13b so as to display the first and the second game images one on top of the other (that is, the first and the second game images are displayed one on top of the other with no boundary portion being provided). Moreover, a horizontally longer LCD, which has the same length as the second LCD 12 and twice the width of the second LCD 12, may be disposed on one principal surface of the lower housing 13b so as to display the first and the second game images side-by-side (that is, the first and the second game images may be side-by-side displayed adjacent to each other with no boundary portion being provided). That is, a physically single screen may be divided in two screens so as to display the first and the second game images, respectively. In any of the aforementioned methods for displaying the game images, the touch panel 15 is disposed on the screen on which the second game image is displayed, thereby enabling the present invention to be similarly realized. Furthermore, in a case where the physically single screen is divided into two screens so as to display the first and the second game images, respectively, the touch panel 15 may be disposed all over the whole screen (so as to cover two screens).

In addition, in the aforementioned embodiment, the touch panel 15 is integrated into the game apparatus 1. Needless to say, however, also when the game apparatus and the touch panel are separately provided, the present invention can be realized. Further, the touch panel 15 may be provided on the upper principal surface of the first LCD 11. Furthermore, although in the aforementioned embodiment two display screens (that is, the first LCD 11 and the second LCD 12) are provided, the number of display screens provided can be one. That is, in the aforementioned embodiment, it is also possible to provide only the second LCD 12 as a display screen and the touch panel 15 thereon without the first LCD 11 being provided. In addition, in the aforementioned embodiment, the second LCD 12 is not provided and the touch panel 15 may be provided on the upper principal surface of the first LCD 11.

Although in the aforementioned embodiment a touch panel is used as an input device for the game apparatus 1, another pointing device maybe used. Here, the pointing device is an input device for designating an input position or coordinates on a screen. For example, when a mouse, a track pad, a track ball or the like is used as an input means, and information which relates to the drum coordinate system and is calculated based on the output value outputted from the input means is used, the present invention can be realized in a similar manner.

Moreover, although in the aforementioned embodiment the touch panel 15 is integrated into the game apparatus 1, the touch panel may be used as an input means for an information processing apparatus (game apparatus) such as a typical personal computer.

The storage medium having stored thereon the game program and the game apparatus according to the example embodiment presented herein are operable to representing various character actions through the same touch-operation using a pointing device, and are useful as an information processing apparatus such as a game apparatus operated using the pointing device like the touch panel and as a game program and the like executed by the information processing apparatus.

While the example embodiment has been described in detail, the foregoing description is in all aspects illustrative and not restrictive. It is understood that numerous other modifications and variations can be devised without departing from the scope of the example embodiment.

What is claimed is:

1. A storage medium having stored thereon a game program to be executed by a computer of a game apparatus which displays on a display screen a game image representing at least a portion of a virtual space in which a player object and at least another object appear, and which is operated using a pointing device that outputs input coordinates of a coordinate system on the display screen according to an operation performed by a player, wherein the game program causes the computer to execute:

first determination range setting that sets, in the virtual space, a first determination range based on virtually positioned coordinates and a facing direction of the player object, wherein the first determination range is set in the virtual space as a range having a predetermined angle between a facing direction of the player object and a direction offset to a left side of the facing direction and the predetermined angle between the facing direction of the player object and a direction offset to a right side of the facing direction, based on the virtually positioned coordinates of the player object;

detecting input coordinates outputted by the pointing device in response to selection of the input coordinates on the display screen using the pointing device;

first action process that executes, when the input coordinates indicate that said another object is in the first determination range, a predetermined action between said another object and the player object; and player object position update that updates, when the input coordinates indicate a position outside the first determination range, the virtually positioned coordinates of the player object stored in a memory such that the player object is moved toward the indicated position outside the first determination range.

2. The storage medium having the game program stored thereon according to claim 1, wherein the first action process includes determining an action to be performed between the player object and said another object according to a combination of an item held by the player object and a type of said another object.

3. The storage medium having the game program stored thereon according to claim 1, wherein the first determination range setting includes changing a size of the first determination range according to an item held by the player object.

4. The storage medium having the game program stored thereon according to claim 1, wherein the game program causes the computer to further execute:

second determination range setting that sets, in the virtual space, a second determination range which is different from the first determination range, based on the position of the player object; and a second action process that executes, when the input coordinates indicate a specific object positioned in the second determination range outside the first determination range, an action between the specific object and the player object, the action being different from the action performed in the first action process between the specific object and the player object.

5. The storage medium having the game program stored thereon according to claim 1, wherein the game program causes the computer to further execute a player action process that performs, when the input coordinates indicate the player object, a predetermined action between the player object and said another object positioned in the first determination range based on the virtually positioned coordinates of said another object.

6. A storage medium having stored thereon a game program to be executed by a computer of a game apparatus which displays on a display screen a game image representing at least a portion of a virtual space in which a player object and at least another object appear, and which is operated using a pointing device that outputs input coordinates of a coordinate system on the display screen according to an operation performed by a player, wherein the game program causes the computer to execute:

first determination range setting that sets, in the virtual space, a first determination range based on virtually positioned coordinates and a facing direction of the player object, wherein the first determination range is set in the virtual space as a range having a predetermined angle between a facing direction of the player object and a direction offset to a left side of the facing direction and the predetermined angle between the facing direction of the player object and a direction offset to a right side of the facing direction, based on the virtually positioned coordinates of the player object;

virtual input coordinate calculation that calculates, when the input coordinates are outputted, virtual input coordinates which are in the virtual space and overlap with the input coordinates on the display screen;

first action process that executes, when the virtual input coordinates indicate that said another object is in the first determination range, a predetermined action between said another object and the player object; and player object position update that updates, when the virtual input coordinates indicate a position outside the first determination range, the virtually positioned coordinates of the player object stored in a memory such that the player object is moved toward the indicated position outside the first determination range.

7. The storage medium having the game program stored thereon according to claim 6, wherein the first action process includes determining an action to be performed between the player object and said another object according to a combination of an item held by the player object and a type of said another object.

8. The storage medium having the game program stored thereon according to claim 6, wherein
the first determination range setting includes changing a size of the first determination range according to an item held by the player object.

9. The storage medium having the game program stored thereon according to claim 6, wherein
the game program causes the computer to further execute:
second determination range setting that sets, in the virtual space, a second determination range which is different from the first determination range, based on the position of the player object; and
a second action process that executes, when the virtual input coordinates indicate a specific object positioned in the second determination range outside the first determination range, an action between the specific object and the player object, the action being different from the action performed in the first action process between the specific object and the player object.

10. The storage medium having the game program stored thereon according to claim 6, wherein
the game program causes the computer to further execute a player action process that performs, when the virtual input coordinates indicate the player object, a predetermined action between the player object and said another object positioned in the first determination range based on the virtually positioned coordinates of said another object.

11. A game apparatus which displays on a display screen a game image representing at least a portion of a virtual space in which a player object and at least another object appear, and which is operated using a pointing device that outputs input coordinates of a coordinate system on the display screen according to an operation performed by a player, the game apparatus comprising:
storage locations;
first determination range setting programmed logic circuitry that sets, in the virtual space, a first determination range based on virtually positioned coordinates and a facing direction of the player object, wherein
the first determination range is set in the virtual space as a range having a predetermined angle between a facing direction of the player object and a direction offset to a left side of the facing direction and the predetermined angle between the facing direction of the player object and a direction offset to a right side of the facing direction, based on the virtually positioned coordinates of the player object;
detection programmed logic circuitry that detects input coordinates outputted by the pointing device in response to selection of the input coordinates on the display screen using the pointing device;
first action process programmed logic circuitry that executes, when the input coordinates indicate that said another object is in the first determination range, a predetermined action between the designated object and the player object;
player object position update programmed logic circuitry that updates, when the input coordinates indicate a position outside the first determination range, the virtually positioned coordinates of the player object stored in the storage locations such that the player object is moved toward the indicated position.

12. A game apparatus which displays on a display screen a game image representing at least a portion of a virtual space in which a player object and at least another object appear, and which is operated using a pointing device that outputs input coordinates of a coordinate system on the display screen according to an operation performed by a player, the game apparatus comprising:
storage locations;
first determination range setting programmed logic circuitry that sets, in the virtual space, a first determination range based on virtually positioned coordinates and a facing direction of the player object, wherein
the first determination range is set in the virtual space as a range having a predetermined angle between a facing direction of the player object and a direction offset to a left side of the facing direction and the predetermined angle between the facing direction of the player object and a direction offset to a right side of the facing direction, based on the virtually positioned coordinates of the player object;
virtual input coordinate calculation programmed logic circuitry that calculates, when the input coordinates are outputted, virtual input coordinates which are in the virtual space and overlap with the input coordinates on the display screen;
first action process programmed logic circuitry that executes, when the virtual input coordinates indicate that said another object is in the first determination range, a predetermined action between said another object and the player object;
player object position update programmed logic circuitry that updates, when the virtual input coordinates indicate a position outside the first determination range, the virtually positioned coordinates of the player object stored in the storage locations such that the player object is moved toward the indicated position.

* * * * *